(12) United States Patent
Mayo et al.

(10) Patent No.: US 10,925,354 B1
(45) Date of Patent: Feb. 23, 2021

(54) METHODS FOR PREPARING A SLIDE FASTENER FOR OPERATIONAL USE ON AN ARTICLE

(71) Applicant: IDEAL FASTENER CORPORATION, Miami, FL (US)

(72) Inventors: William Mayo, Raleigh, NC (US); Gary Davis, Martin, GA (US)

(73) Assignee: IDEAL Fastener Corporation, Oxford, NC (US)

( * ) Notice: Subject to any disclaimer, the term of this patent is extended or adjusted under 35 U.S.C. 154(b) by 11 days.

(21) Appl. No.: 16/414,998

(22) Filed: May 17, 2019

Related U.S. Application Data

(60) Provisional application No. 62/672,929, filed on May 17, 2018.

(51) Int. Cl.
*A44B 19/42* (2006.01)
*A44B 19/62* (2006.01)
(Continued)

(52) U.S. Cl.
CPC ............ *A44B 19/42* (2013.01); *A44B 19/44* (2013.01); *A44B 19/52* (2013.01); *A44B 19/58* (2013.01);
(Continued)

(58) Field of Classification Search
CPC ......... A44B 19/42; A44B 19/44; A44B 19/52; A44B 19/58; A44B 19/62; A44B 19/64;
(Continued)

(56) References Cited

U.S. PATENT DOCUMENTS

| 1,952,506 A | 3/1934 | Legat |
| 2,166,350 A | 7/1939 | Freshman |

(Continued)

FOREIGN PATENT DOCUMENTS

| CN | 106687006 A | 5/2017 |
| CN | 107072409 A | 8/2017 |

(Continued)

OTHER PUBLICATIONS

"European Search Report," European Patent Application No. 15840374.1 for Ideal Fastener Corporation, dated Mar. 13, 2018 (9 pages).

(Continued)

*Primary Examiner* — Jermie E Cozart
(74) *Attorney, Agent, or Firm* — Tillman, Wright & Wolgin; David Higgins; Neal Wolgin

(57) ABSTRACT

A method of preparing a cut length of slide fastener chain for operational use includes: providing a system that includes first and second machines; providing a cut length of slide fastener chain; introducing a notch to one end of the cut length of slide fastener chain, using the first machine; orienting a slider body onto a positioning device, using the second machine, so that the slider body is in a fixed position; inserting the notched end of the cut length of slide fastener chain into a mouth of the slider body; and pulling the cut length of slide fastener chain through the slider body by a distance, thereby mounting the slider body to the cut length of slide fastener chain.

10 Claims, 24 Drawing Sheets

(51) Int. Cl.
  *B21D 53/50* (2006.01)
  *A44B 19/58* (2006.01)
  *A44B 19/52* (2006.01)
  *A44B 19/44* (2006.01)
  *B21D 53/54* (2006.01)
  *A44B 19/64* (2006.01)
  *D06H 7/02* (2006.01)

(52) U.S. Cl.
  CPC .............. *A44B 19/62* (2013.01); *B21D 53/50* (2013.01); *B21D 53/54* (2013.01); *D06H 7/02* (2013.01); *A44B 19/64* (2013.01); *Y10T 29/49783* (2015.01); *Y10T 29/533* (2015.01); *Y10T 29/53291* (2015.01)

(58) Field of Classification Search
  CPC ... B21D 53/50; B21D 53/54; Y10T 29/49783; Y10T 29/533; Y10T 29/53291
  See application file for complete search history.

(56) References Cited

U.S. PATENT DOCUMENTS

| | | | |
|---|---|---|---|
| 2,170,609 A * | 8/1939 | Nedal | A44B 19/42 83/371 |
| 2,191,963 A | 2/1940 | London | |
| 2,400,731 A | 5/1946 | Armstrong | |
| 2,415,643 A | 2/1947 | Legat | |
| 2,519,012 A | 8/1950 | Babcock | |
| 2,708,968 A * | 5/1955 | Soave | A44B 19/58 83/39 |
| 2,838,112 A * | 6/1958 | Feitl | A44B 19/58 83/468.6 |
| 2,838,831 A * | 6/1958 | Aubuchon | B21D 53/50 269/49 |
| 2,868,288 A * | 1/1959 | Feitl | A44B 19/58 83/466.1 |
| 2,932,872 A | 4/1960 | Geissmann | |
| 3,081,462 A | 3/1963 | Radovsky | |
| 3,225,429 A | 12/1965 | Fady | |
| 3,287,749 A | 11/1966 | Marsico | |
| 3,340,594 A | 9/1967 | Frohlich et al. | |
| 3,488,239 A | 1/1970 | Heimberger | |
| 3,490,098 A | 1/1970 | Frohlich | |
| 3,492,714 A | 2/1970 | Frohlich et al. | |
| 3,530,563 A * | 9/1970 | Maeda | A44B 19/62 29/33.2 |
| 3,601,826 A | 8/1971 | Smith | |
| 3,768,125 A | 10/1973 | Frohlich | |
| 3,875,647 A * | 4/1975 | Yoshida | A44B 19/64 29/408 |
| 3,956,812 A * | 5/1976 | Kawakami | A44B 19/62 29/768 |
| 4,000,545 A | 1/1977 | Takamatsu | |
| 4,293,994 A * | 10/1981 | Moertel | A44B 19/64 29/409 |
| 4,324,034 A | 4/1982 | Berry et al. | |
| 4,362,487 A | 12/1982 | Takahashi | |
| 4,388,738 A | 6/1983 | Wagner | |
| 4,428,264 A * | 1/1984 | Shimai | A44B 19/58 29/408 |
| 5,136,741 A | 8/1992 | Balonick et al. | |
| 5,142,772 A * | 9/1992 | Ishikawa | A44B 19/42 29/408 |
| 5,212,863 A * | 5/1993 | Matsumoto | A44B 19/58 29/408 |
| 5,414,882 A | 5/1995 | Goodale | |
| 5,596,793 A | 1/1997 | Davis | |
| 5,628,093 A | 5/1997 | Goodale | |
| 5,806,163 A | 9/1998 | Shimai et al. | |
| 6,502,285 B2 | 1/2003 | Kiely | |
| 6,832,415 B2 | 12/2004 | Higginbotham | |
| 6,966,090 B2 | 11/2005 | McClintock et al. | |
| 7,487,560 B2 | 2/2009 | McGrath et al. | |
| 7,552,489 B2 | 6/2009 | Bell et al. | |
| 8,347,430 B2 | 1/2013 | Malouf et al. | |
| 8,719,977 B2 | 5/2014 | Rabbany et al. | |
| 8,800,118 B2 | 8/2014 | Takasawa | |
| 8,938,824 B2 | 1/2015 | Rensink et al. | |
| 8,973,223 B2 | 3/2015 | Blackford et al. | |
| 9,386,826 B2 | 7/2016 | Lu | |
| 9,398,789 B2 | 7/2016 | Blackford | |
| 9,601,034 B2 | 3/2017 | Jensen et al. | |
| 9,944,028 B1 | 4/2018 | Davis et al. | |
| 9,986,846 B1 | 6/2018 | Davis | |
| 10,144,186 B1 | 12/2018 | Davis et al. | |
| 2003/0106157 A1 | 6/2003 | Rugset | |
| 2005/0132498 A1 | 6/2005 | Vrionis | |
| 2009/0293198 A1 | 12/2009 | Fodge et al. | |
| 2010/0154179 A1 | 6/2010 | Blackford et al. | |
| 2012/0102646 A1 | 5/2012 | Chen et al. | |
| 2012/0137434 A1 | 6/2012 | Dusaj | |
| 2012/0137476 A1 * | 6/2012 | La Rocca | A44B 19/06 24/405 |
| 2012/0233739 A1 | 9/2012 | Blackford | |
| 2012/0255120 A1 | 10/2012 | Poston et al. | |
| 2013/0232738 A1 | 9/2013 | Tominaga et al. | |
| 2016/0073743 A1 | 3/2016 | Davis et al. | |
| 2016/0081437 A1 | 3/2016 | Davis | |
| 2016/0128499 A1 | 5/2016 | Jhou | |
| 2016/0331160 A1 | 11/2016 | Rattner et al. | |
| 2018/0008053 A1 | 1/2018 | Davis | |
| 2020/0086596 A1 | 3/2020 | Davis et al. | |

FOREIGN PATENT DOCUMENTS

| | | |
|---|---|---|
| EP | 0875167 A2 | 11/1998 |
| EP | 2685860 B1 | 10/2016 |
| EP | 3190917 | 7/2017 |
| EP | 3190917 B1 | 1/2020 |
| JP | 2017-527391 A | 9/2017 |
| JP | 2017-529167 A | 10/2017 |
| TW | 201242534 A | 11/2012 |
| WO | 2006103438 A1 | 10/2006 |
| WO | 2016040726 A1 | 3/2016 |
| WO | 2016049121 A1 | 3/2016 |

OTHER PUBLICATIONS

"International Preliminary Report on Patentability" of the International Search Authority (ISA/US) in Ideal Fastener Corporation, International Patent Application Serial No. PCT/US2015/049555, dated Mar. 14, 2017 (8 pages).

"International Search Report" and "Written Opinion" of the International Search Authority (ISA/US) in Ideal Fastener Corporation, International Patent Application Serial No. PCT/US2015/049555, dated Dec. 10, 2015 (26 pages).

\* cited by examiner

METHODS FOR PREPARING A SLIDE FASTENER FOR OPERATIONAL USE ON AN ARTICLE

CROSS-REFERENCE TO RELATED APPLICATION

The present application is a U.S. nonprovisional patent application of, and claims priority under 35 U.S.C. § 119(e) to, U.S. provisional patent application Ser. No. 62/672,929, filed May 17, 2018, and entitled, "METHODS FOR PREPARING A SLIDE FASTENER FOR INSTALLATION ONTO AN ARTICLE," which provisional patent application is incorporated by reference herein in its entirety. A copy of U.S. provisional patent application Ser. No. 62/672,929 is attached hereto as APPENDIX A, which is also incorporated by reference herein in its entirety.

COPYRIGHT STATEMENT

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

BACKGROUND OF THE PRESENT INVENTION

Field of the Present Invention

The present invention relates generally to a process of preparing a slide fastener for operational use on an article, and, in particular, to a process of preparing a slide fastener for operational use on an end-use article where the slide fastener encircles the article, such as a mattress cover.

Background

A conventional slide fastener includes a pair of slide fastener stringers halves each with a row of teeth. When the rows of teeth are interlocked with one another, the stringer halves are coupled together and a continuous length of slide fastener chain is formed. The continuous length of slide fastener chain can then be installed in a wide range of different articles for use as a closure device.

In one such implementation, slide fastener chain is installed along edges of a mattress cover in order that the cover may encase and be closed around a mattress. In a conventional method of installation on a mattress cover with two or more fabric panels, the continuous slide fastener chain is cut to a desired length that usually coincides with a length of the perimeter edge of one fabric panel of the mattress cover. Once cut to length, various hardware components are installed to add functionality to the slide fastener, including a pin-and-box assembly, top stops, and a slider body. The slider body operates as a coupling device to bring the rows of teeth into or out of an interlocked configuration, thereby opening or closing the stringer halves. Hardware components are selected to facilitate functionality as a fully separating slide fastener or as a closed-end slide fastener or as a two-way slide fastener.

With hardware components installed, the finished slide fastener is typically sewn onto the fabric panels of the mattress cover. The installed slide fastener facilitates ease of final assembly of the mattress by enabling securement of the top, bottom, and/or side fabric panels together to enclose the mattress within the cover. Additionally, the slide fastener can be opened and closed as needed to adjust the fit of the mattress cover or for replacement of the mattress cover.

However, the use of fully assembled slide fasteners with mattress covers often increases the overall cost of the manufacturing process. Each hardware component (e.g., a pin-and-box assembly, top stops, and a slider body) must be installed and properly aligned on the cut length of slide fastener chain before the finished slide fastener can be sewn to the fabric panels. Installing each hardware component usually requires use of certain specific machinery, which increases capital investment and labor costs associated with the manufacturing process.

Thus, a need exists for a method of preparing a slide fastener for operational use on an article that simplifies or streamlines the manufacturing process. Additionally, a need exists for a method of preparing a slide fastener for operational use on an article with reduced cost as compared with conventional methods. This and other needs are addressed by one or more aspects of the present invention.

SUMMARY OF THE PRESENT INVENTION

Some exemplary embodiments of the present invention may overcome one or more of the above disadvantages and other disadvantages not described above, but the present invention is not required to overcome any particular disadvantage described above, and some exemplary embodiments of the present invention may not overcome any of the disadvantages described above.

Broadly defined, the present invention according to one aspect includes a method of preparing a cut length of slide fastener chain for installation. The method includes: providing a system that includes first and second machines; introducing a die-cut to one end of the cut length of slide fastener chain using a cutting die associated with the first machine, thereby removing heads from coupling elements located at the one end without damaging adjacent coupling elements; orienting a slider onto a positioning device, using the second machine, so that the slider is in a fixed position; and inserting the die-cut end of the cut length of slide fastener chain into a mouth of the slider and pulling the cut length of slide fastener chain through the slider, thereby mounting the slider to the cut length of slide fastener chain.

In a feature of this aspect, the cut length of slide fastener chain includes coil-type coupling elements.

In another feature of this aspect, the cut length of slide fastener chain includes plastic coupling elements.

In another feature of this aspect, the cut length of slide fastener chain includes metal coupling elements.

In another feature of this aspect, the cut length of slide fastener chain includes molded coupling elements.

Broadly defined, the present invention according to another aspect includes a method of preparing a continuous length of slide fastener chain for installation onto a mattress cover. The method includes: introducing at least one straight cut across the continuous length of fastener chain, thereby forming a cut length; introducing a die-cut to one end of the cut length of slide fastener chain using a system, thereby removing heads from coupling elements located at the one end without damaging adjacent coupling elements; orienting a slider onto a positioning device, using the system, so that the slider is in a fixed position; and inserting the die-cut end of the cut length of slide fastener chain into a mouth of the slider and pulling the cut length of slide fastener chain through the slider, thereby mounting the slider to the cut length of slide fastener chain and forming a prepared length of slide fastener chain capable of installation on a mattress cover.

In a feature of this aspect, the continuous length of slide fastener chain includes coil-type coupling elements.

In another feature of this aspect, the continuous length of slide fastener chain includes plastic coupling elements.

In another feature of this aspect, the continuous length of slide fastener chain includes metal coupling elements.

In another feature of this aspect, the continuous length of slide fastener chain includes molded coupling elements.

In another feature of this aspect, the system is at least semiautomatic.

In another feature of this aspect, at least portions of the system are automatic.

Broadly defined, the present invention according to another aspect includes a method of preparing a cut length of slide fastener chain for operational use. The method includes: providing a system that includes first and second machines; providing a cut length of slide fastener chain; introducing a notch to one end of the cut length of slide fastener chain, using the first machine; orienting a slider body onto a positioning device, using the second machine, so that the slider body is in a fixed position; inserting the notched end of the cut length of slide fastener chain into a mouth of the slider body; and pulling the cut length of slide fastener chain through the slider body by a distance, thereby mounting the slider body to the cut length of slide fastener chain.

In a feature or this aspect, the cut length of slide fastener chain includes coil-type coupling elements.

In another feature or this aspect, the cut length of slide fastener chain includes molded coupling elements.

In another feature or this aspect, the cut length of slide fastener chain includes metal coupling elements.

In another feature or this aspect, at least one of the first and second machines operates at least semi-automatically.

In another feature or this aspect, introduction of the notch removes heads from a quantity of coupling elements located at the one end of the cut length of slide fastener chain without damaging adjacent coupling elements.

In another feature or this aspect, introduction of the notch removes a quantity of coupling elements located at the one end of the cut length of slide fastener chain without damaging adjacent coupling elements.

In another feature or this aspect, the first machine includes a mechanical punch press assembly having a punch and cutting die for removing or altering one or more coupling elements at the one end of the cut length of slide fastener chain. In another feature or this aspect, the first machine includes a foot pedal. In another feature or this aspect, compression of the foot pedal actuates the mechanical punch press assembly to introduce the notch. In another feature or this aspect, the first machine includes pressure pads at one or both sides of the punch for gripping the cut length of slide fastener chain during introduction of the notch.

In another feature or this aspect, the second machine includes a vibratory feed container that feeds slider bodies to the positioning device. In another feature or this aspect, the positioning device includes a pneumatic actuator for maneuvering slider bodies, one at a time, to the fixed position.

In another feature or this aspect, the provided cut length of slide fastener chain is secured to at least a portion of an article. In another feature or this aspect, the article is a mattress cover.

Broadly defined, the present invention according to another aspect includes a method of preparing a slide fastener chain for operational use. The method includes: providing a continuous length of slide fastener chain and a slider body; providing a system having a notching machine and a slider body mounting machine; introducing at least one straight cut across the continuous length of slide fastener chain, thereby forming a cut length of slide fastener chain; introducing a notch to one end of the cut length of slide fastener chain using the notching machine; orienting the slider body onto a positioning device, using the slider body mounting machine, so that the slider body is in a fixed position; inserting the notched end of the cut length of slide fastener chain into a mouth of the slider body; and pulling the cut length of slide fastener chain through the slider body by a distance, thereby mounting the slider body to the cut length of slide fastener chain and forming a prepared length of slide fastener chain ready for operational use.

In a feature or this aspect, the continuous length of slide fastener chain includes coil-type coupling elements.

In another feature or this aspect, the continuous length of slide fastener chain includes molded coupling elements.

In another feature or this aspect, the continuous length of slide fastener chain includes metal coupling elements.

In another feature or this aspect, introduction of the notch removes heads from a quantity of coupling elements located at the one end of the cut length of slide fastener chain without damaging adjacent coupling elements.

In another feature or this aspect, the cut length of slide fastener chain with mounted slider body is installed on a mattress cover.

In another feature or this aspect, at least one of the notching machine and the slider body mounting machine operates at least semi-automatically.

In another feature or this aspect, introduction of the notch removes a quantity of coupling elements located at the one end of the cut length of slide fastener chain without damaging adjacent coupling elements.

In another feature or this aspect, the notching machine includes a mechanical punch press assembly having a punch and cutting die for removing or altering one or more coupling elements at the one end of the cut length of slide fastener chain. In another feature or this aspect, the notching machine includes a foot pedal. In another feature or this aspect, compression of the foot pedal actuates the mechanical punch press assembly to introduce the notch. In another feature or this aspect, the notching machine includes pressure pads at one or both sides of the punch for gripping the cut length of slide fastener chain during introduction of the notch.

In another feature or this aspect, the slider body mounting machine includes a vibratory feed container that feeds slider bodies to the positioning device. In another feature or this aspect, the positioning device includes a pneumatic actuator for maneuvering slider bodies, one at a time, to the fixed position.

Broadly defined, the present invention according to another aspect includes a method of preparing a slide fastener chain for operational use on a mattress cover. The method includes: providing a continuous length of slide fastener chain secured to at least a portion of a mattress cover; providing a slider body; providing a system having a notching machine and a slider body mounting machine; introducing at least one straight cut across the continuous length of slide fastener chain, thereby forming a cut length of slide fastener chain; introducing a notch to one end of the cut length of slide fastener chain using the notching machine; orienting the slider body onto a positioning device, using the slider body mounting machine, so that the slider body is in a fixed position; inserting the notched end of the cut length of slide fastener chain into a mouth of the slider body; and pulling the cut length of slide fastener chain through the slider body by a distance, thereby mounting the slider body to the cut length of slide fastener chain.

In a feature or this aspect, the continuous length of slide fastener chain includes coil-type coupling elements.

In another feature or this aspect, the continuous length of slide fastener chain includes molded coupling elements.

In another feature or this aspect, the continuous length of slide fastener chain includes metal coupling elements.

In another feature or this aspect, introduction of the notch removes heads from a quantity of coupling elements located at the one end of the cut length of slide fastener chain without damaging adjacent coupling elements.

In another feature or this aspect, at least one of the notching machine and the slider body mounting machine operates at least semi-automatically.

In another feature or this aspect, introduction of the notch removes a quantity of coupling elements located at the one end of the cut length of slide fastener chain without damaging adjacent coupling elements.

In another feature or this aspect, the notching machine includes a mechanical punch press assembly having a punch and cutting die for removing or altering one or more coupling elements at the one end of the cut length of slide fastener chain. In another feature or this aspect, the notching machine includes a foot pedal. In another feature or this aspect, compression of the foot pedal actuates the mechanical punch press assembly to introduce the notch. In another feature or this aspect, the notching machine includes pressure pads at one or both sides of the punch for gripping the cut length of slide fastener chain during introduction of the notch.

In another feature or this aspect, the slider body mounting machine includes a vibratory feed container that feeds slider bodies to the positioning device. In another feature or this aspect, the positioning device includes a pneumatic actuator for maneuvering slider bodies, one at a time, to the fixed position.

Broadly defined, the present invention according to another aspect includes a method of using an at least semiautomatic system to modify a cut length of slide fastener chain in preparation for installation, substantially as shown and described.

Broadly defined, the present invention according to another aspect includes a system, including first and second machines, substantially as shown and described.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

Further features, embodiments, and advantages of the present invention will become apparent from the following detailed description with reference to the drawings, wherein.

DETAILED DESCRIPTION

Figure 1:
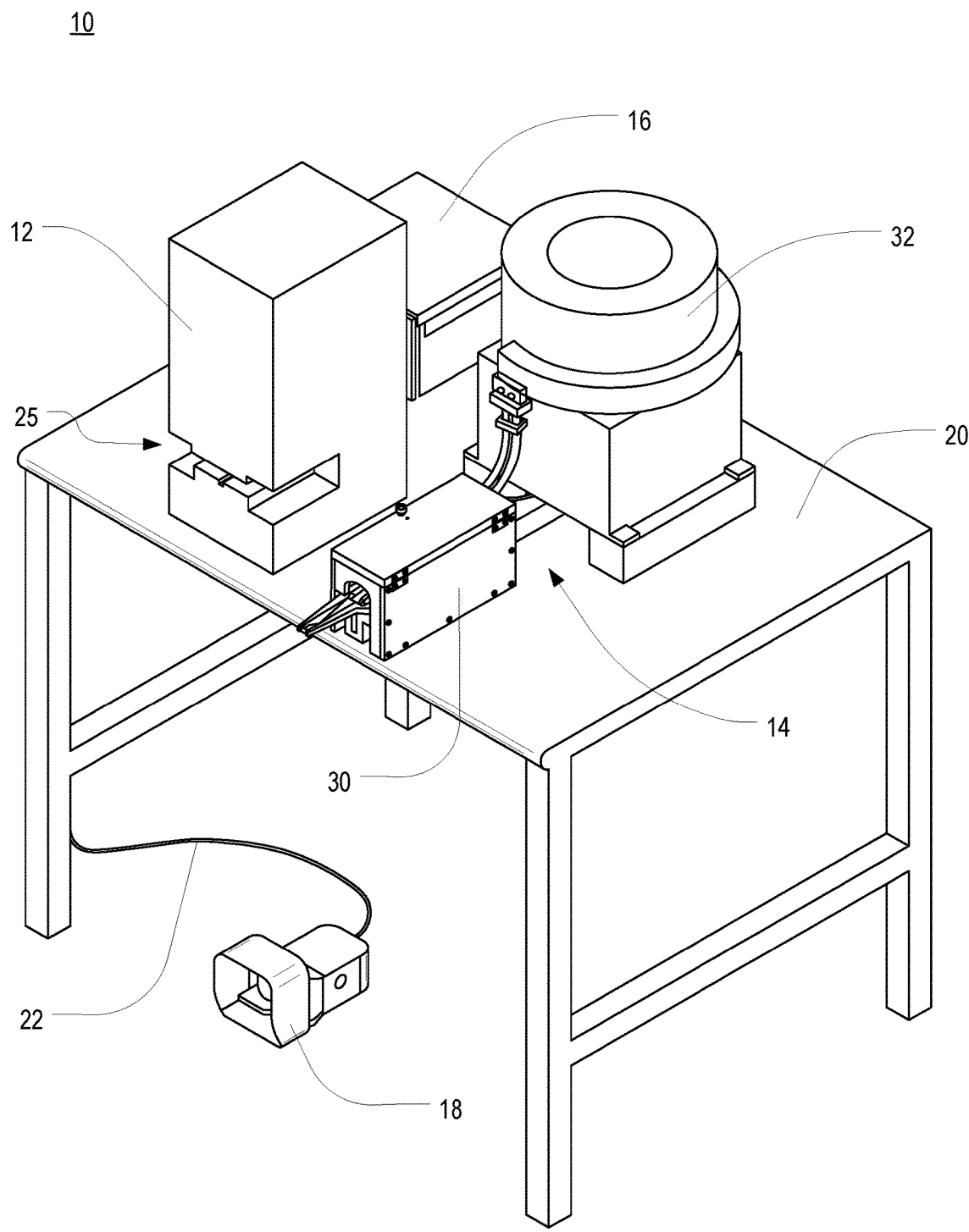
FIG. 1 is an isometric view of a system for preparing a length of slide fastener chain for operational use on an article in accordance with one or more aspects of the present invention.

As a preliminary matter, it will readily be understood by one having ordinary skill in the relevant art ("Ordinary Artisan") that the present invention has broad utility and application. Furthermore, any embodiment discussed and identified as being "preferred" is considered to be part of a best mode contemplated for carrying out the present invention. Other embodiments also may be discussed for additional illustrative purposes in providing a full and enabling disclosure of the present invention. As should be understood, any embodiment may incorporate only one or a plurality of the above-disclosed aspects of the invention and may further incorporate only one or a plurality of the above-disclosed features. Moreover, many embodiments, such as adaptations, variations, modifications, and equivalent arrangements, will be implicitly disclosed by the embodiments described herein and fall within the scope of the present invention.

Accordingly, while the present invention is described herein in detail in relation to one or more embodiments, it is to be understood that this disclosure is illustrative and exemplary of the present invention, and is made merely for the purposes of providing a full and enabling disclosure of the present invention. The detailed disclosure herein of one or more embodiments is not intended, nor is to be construed, to limit the scope of patent protection afforded the present invention, which scope is to be defined by the claims and the equivalents thereof. It is not intended that the scope of patent protection afforded the present invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection afforded the present invention is to be defined by the appended claims rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

Regarding applicability of 35 U.S.C. § 112, ¶6, no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. Thus, reference to "a picnic basket having an apple" describes "a picnic basket having at least one apple" as well as "a picnic basket having apples." In contrast, reference to "a picnic basket having a single apple" describes "a picnic basket having only one apple."

When used herein to join a list of items, "or" denotes "at least one of the items," but does not exclude a plurality of items of the list. Thus, reference to "a picnic basket having cheese or crackers" describes "a picnic basket having cheese without crackers," "a picnic basket having crackers without cheese," and "a picnic basket having both cheese and crackers." Finally, when used herein to join a list of items, "and" denotes "all of the items of the list." Thus, reference to "a picnic basket having cheese and crackers" describes "a picnic basket having cheese, wherein the picnic basket further has crackers," as well as describes "a picnic basket having crackers, wherein the picnic basket further has cheese."

Referring now to the drawings, in which like numerals represent like components throughout the several views, one or more preferred embodiments of the present invention are next described. The following description of one or more preferred embodiment(s) is merely exemplary in nature and is in no way intended to limit the invention, its application, or uses.

In accordance with one or more methods of the present invention, mattress manufacturers (or similar product manufacturers) generally would not need to source finished slide fasteners. Rather, such manufacturers would source two slide fastener components, namely, continuous slide fastener chain and slider bodies. Implementation of methods of the present invention can eliminate a separate need to install a pin-and-box assembly and top stops on the slide fastener chain, thereby simplifying the manufacturing process and reducing associated costs.

In accordance with one or more methods of the present invention, a mattress manufacturer or other product manufacturer acquires continuous slide fastener chain and loose slider bodies as source materials. The continuous slide fastener chain is provided in a closed form, whereby the rows of coupling elements, or teeth, are fully interlocked. Generally, a manufacturer makes a straight cut across the continuous slide fastener chain at any desired length based on the circumference of the mattress or other article and the manufacturer's product design. In some embodiments, it is contemplated that the continuous slide fastener chain is sewn, bonded, or otherwise secured to an end-use article, such as a mattress cover, prior to use of a system 10,110 as described herein. In such cases, the base material of the end-use article (such as a base material for a mattress cover or a portion thereof) may also be in the form of a continuous length such that a cut introduced to the slide fastener chain likewise cuts the material to which the slide fastener chain is attached. In other embodiments, it is contemplated that the continuous slide fastener chain is loose or unattached when it is cut to a preferred length.

It is contemplated that the cut is made so that a cut length of the closed slide fastener chain corresponds with the circumference of the mattress or other article to be covered (to ensure that the cut length is long enough to encircle the article). Cut lengths are typically bundled in a specific quantity for ease of handling and inventory control, for example, in dozens, tens, twenty-fives, or fifties. Once cut to a desired length, the cut lengths of closed slide fastener chain are ready for further processing using a system 10,110 for preparing a length of slide fastener chain for operational use on an article as described herein.

Figure 2:
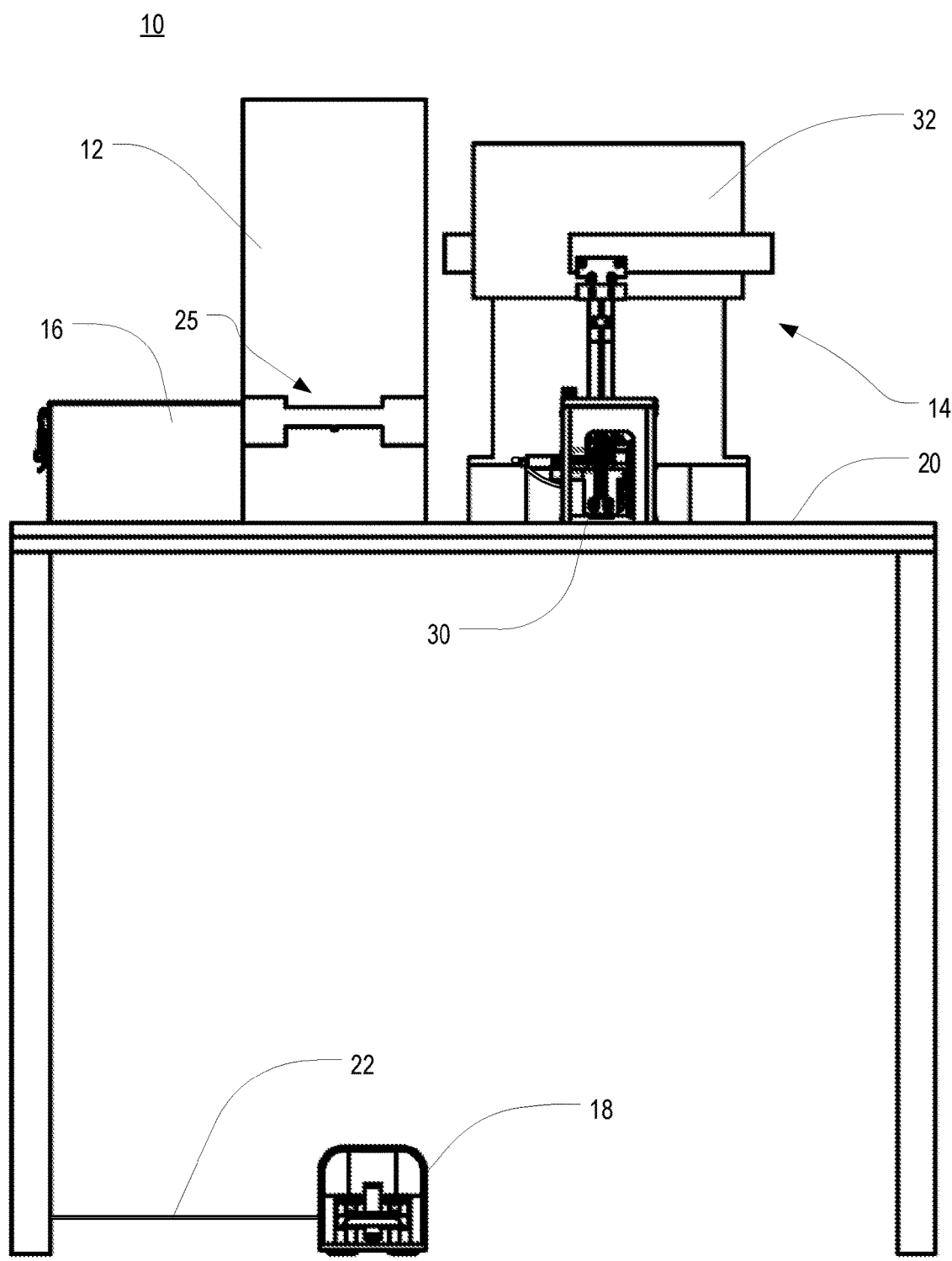
FIGS. 2-4 are front, side, and top views, respectively, of the system of FIG. 1.
Figure 3:
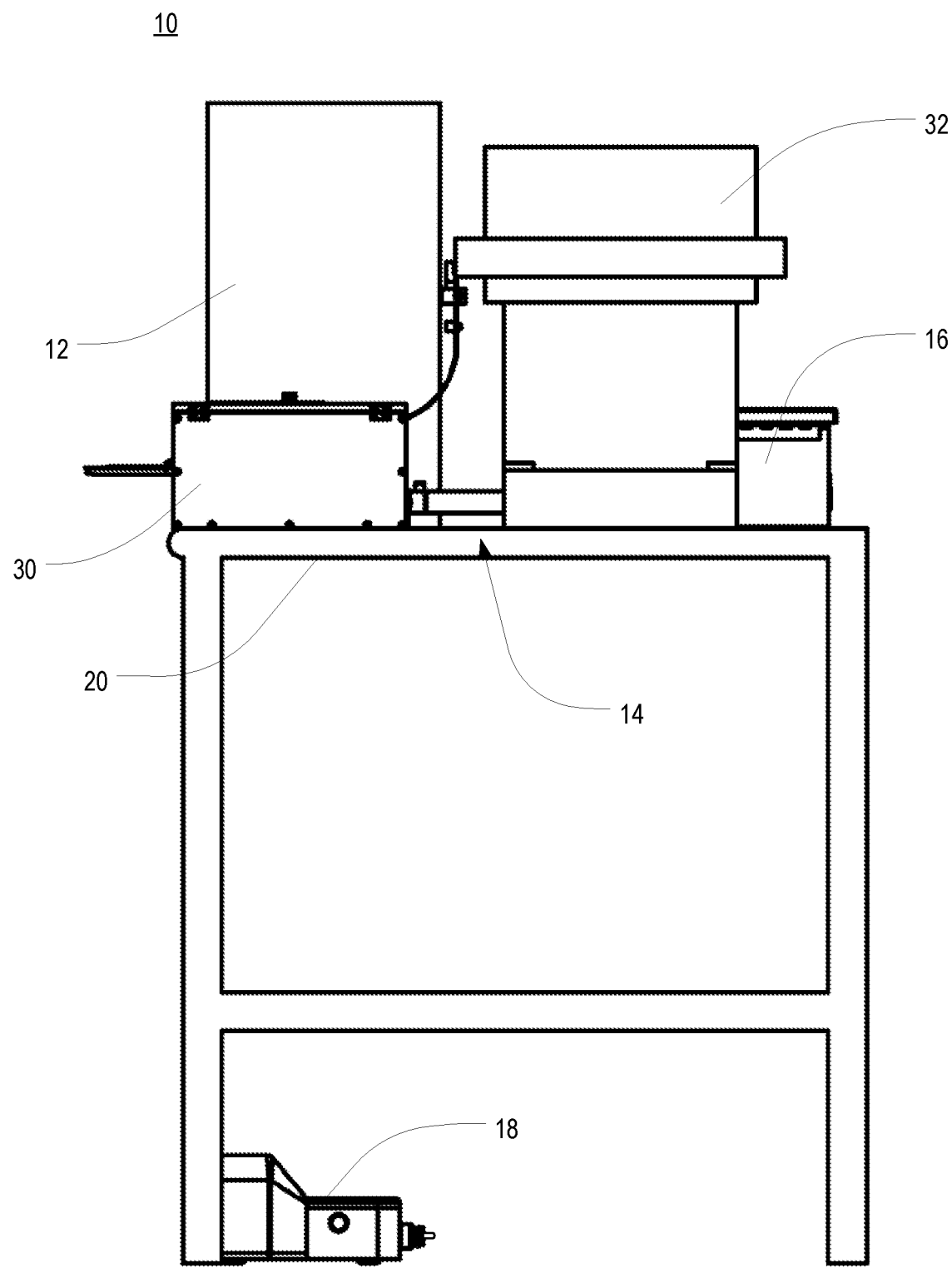
Figure 4:
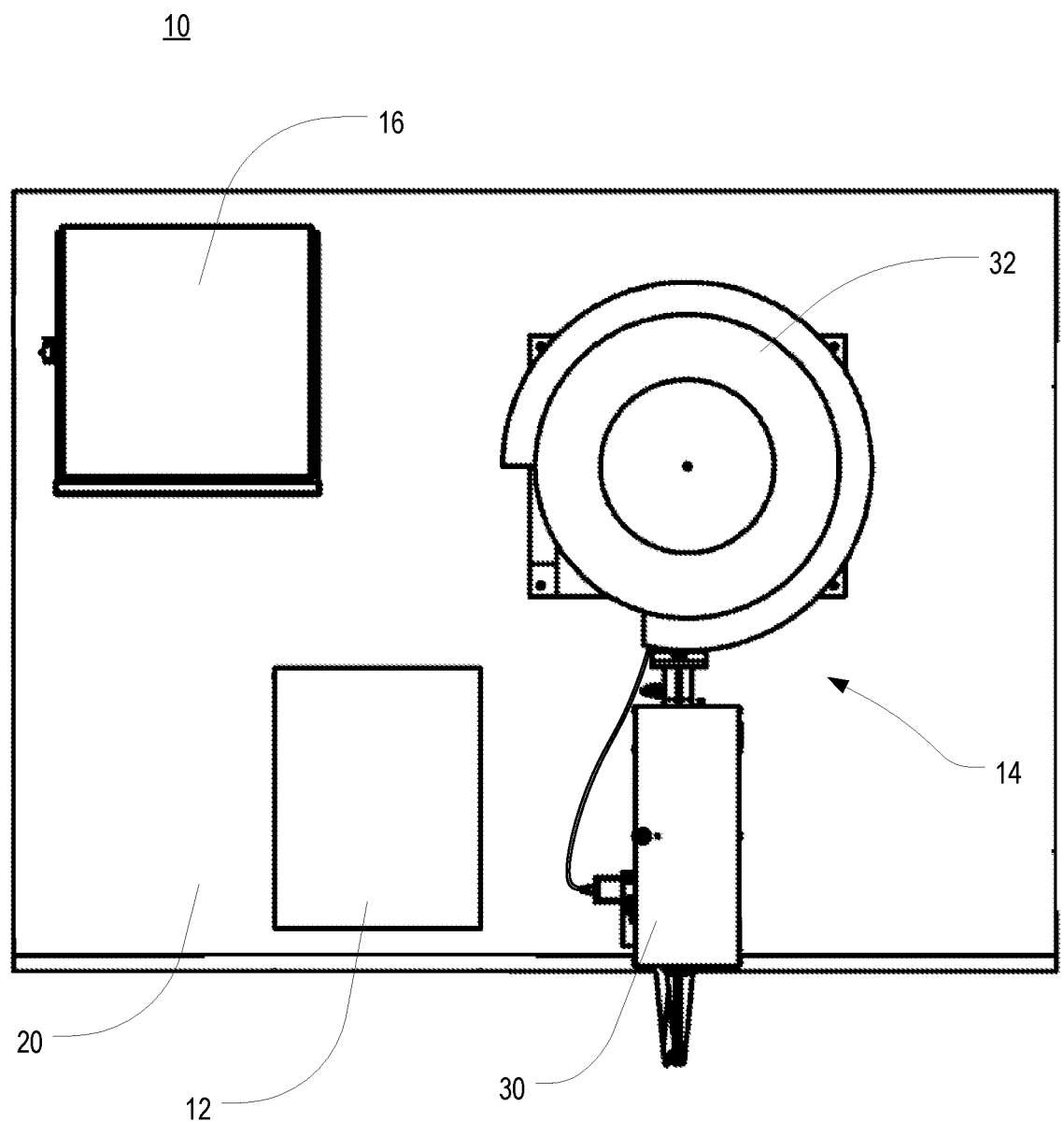

FIG. 1 is an isometric view of a system 10 for preparing a length of slide fastener chain for operational use on an article in accordance with one or more aspects of the present invention, and FIGS. 2-4 are front, side, and top views, respectively, of the system 10 of FIG. 1. As shown generally in FIG. 1, the system includes a notching machine 12 for modifying one end of a cut length of slide fastener chain to prepare the end for receipt of a slider body. The system further includes a slider body mounting machine 14 that positions a slider body for insertion at the modified end of the cut length of slide fastener chain. In this regard, the system 10 facilitates a two-step operation that readies the cut length of slide fastener chain for receipt of a slider body and then positions the slider body for mounting onto the cut length of slide fastener chain at the modified end.

Many components of the system, including the notching machine 12 and the slider body mounting machine 14, are arranged on a table 20 or other support service. A foot pedal 18 for actuating the notching machine 12 is located beneath the table 20 so that an operator seated in front of the table can maneuver a length of slide fastener chain by hand while simultaneously being able to actuate the notching machine by compressing the pedal 18 by foot. A control panel 16 that provides power to the system 10 and enables a user to establish controls and/or settings in the processes is arranged atop the table 20 at a rear side thereof. In at least some embodiments, it is contemplated that the components of the system 10, including the notching machine 12, the slider body mounting machine 14, and the foot pedal 18, are electrically connected to the control panel 16 by wiring or electrical cords 22.

Figure 5:
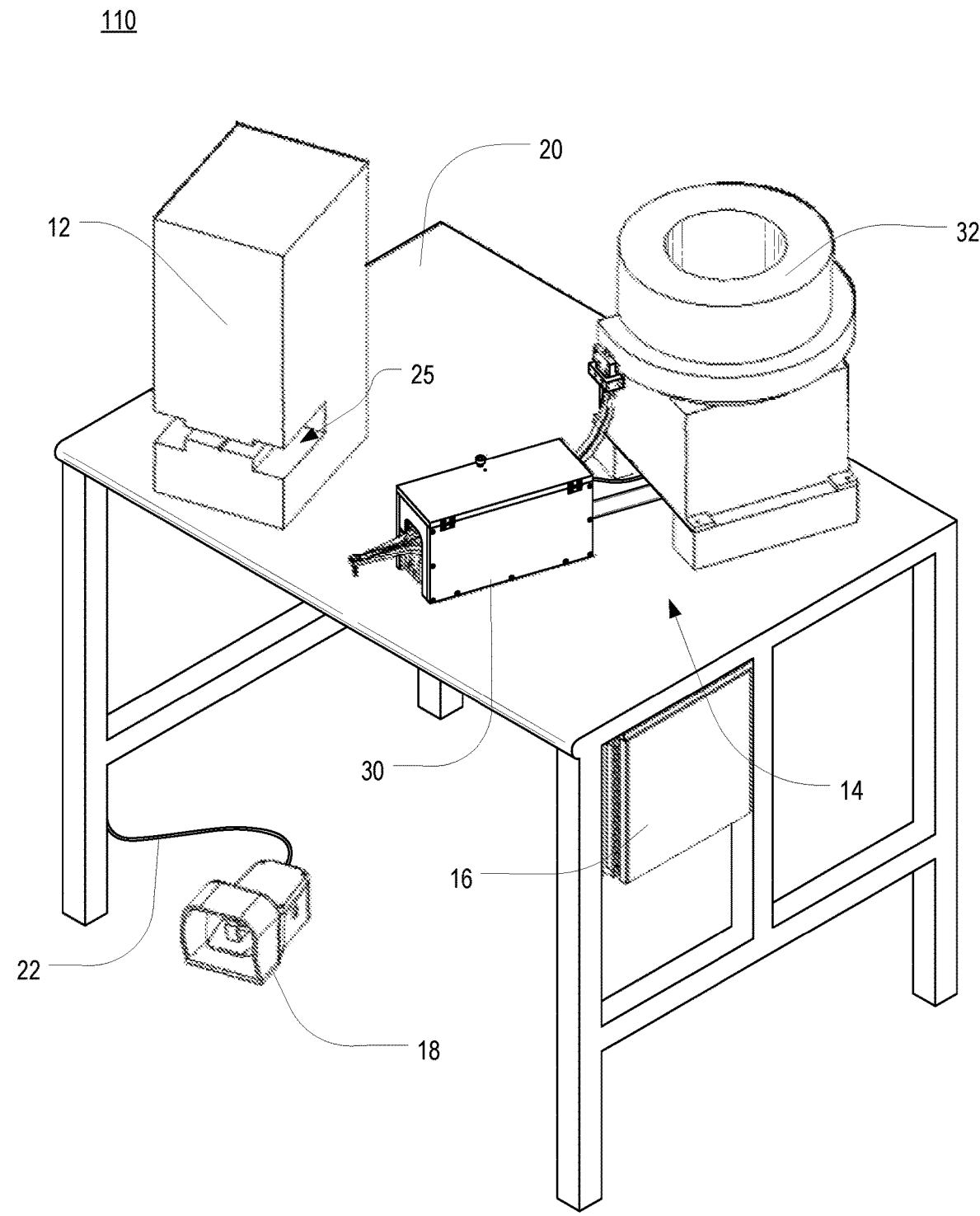
FIG. 5 is an isometric view of another system for preparing a length of slide fastener chain for operational use on an article in accordance with one or more aspects of the present invention.
Figure 6:
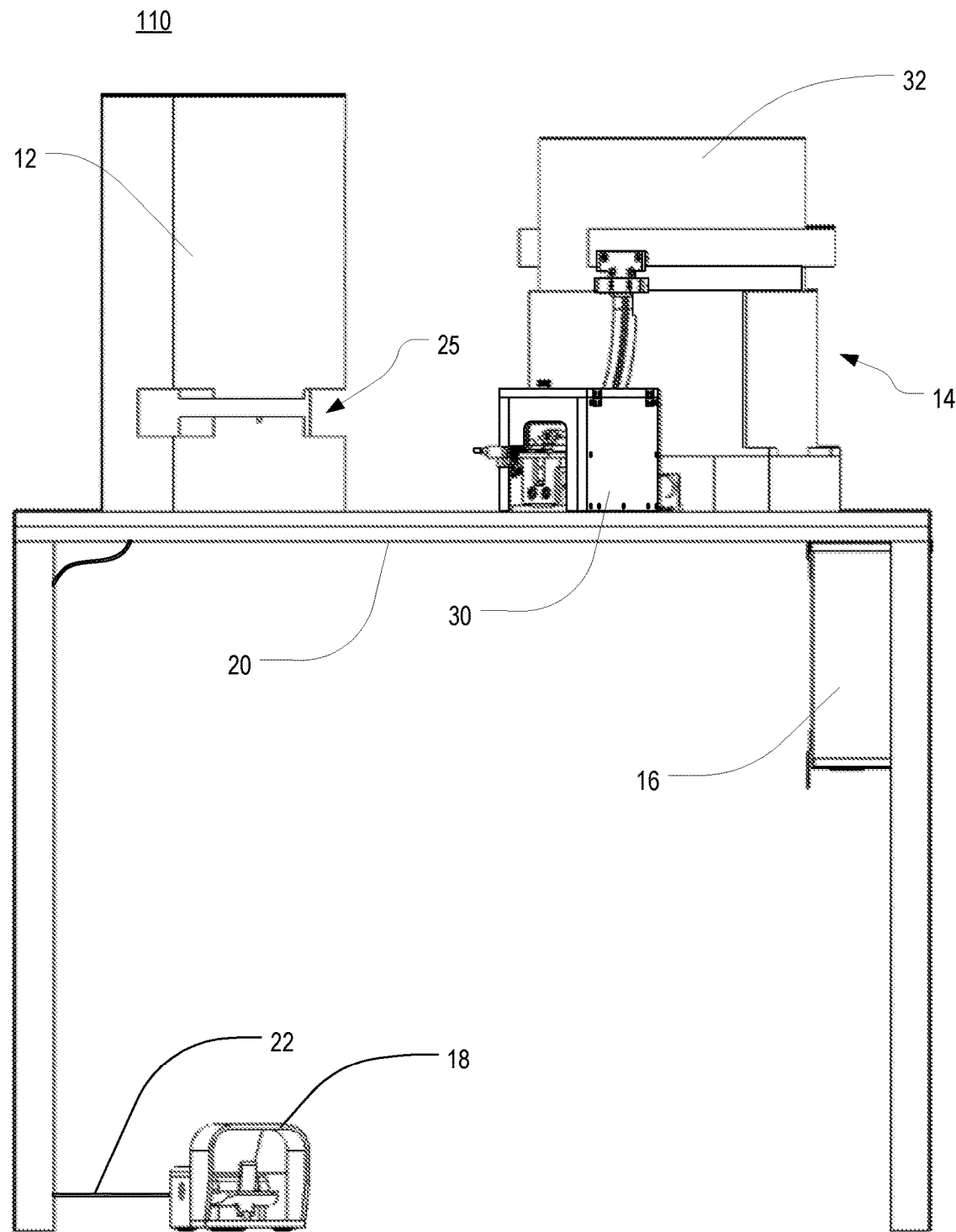
FIGS. 6-8 are front, side, and top views, respectively, of the system of FIG. 5.
Figure 7:
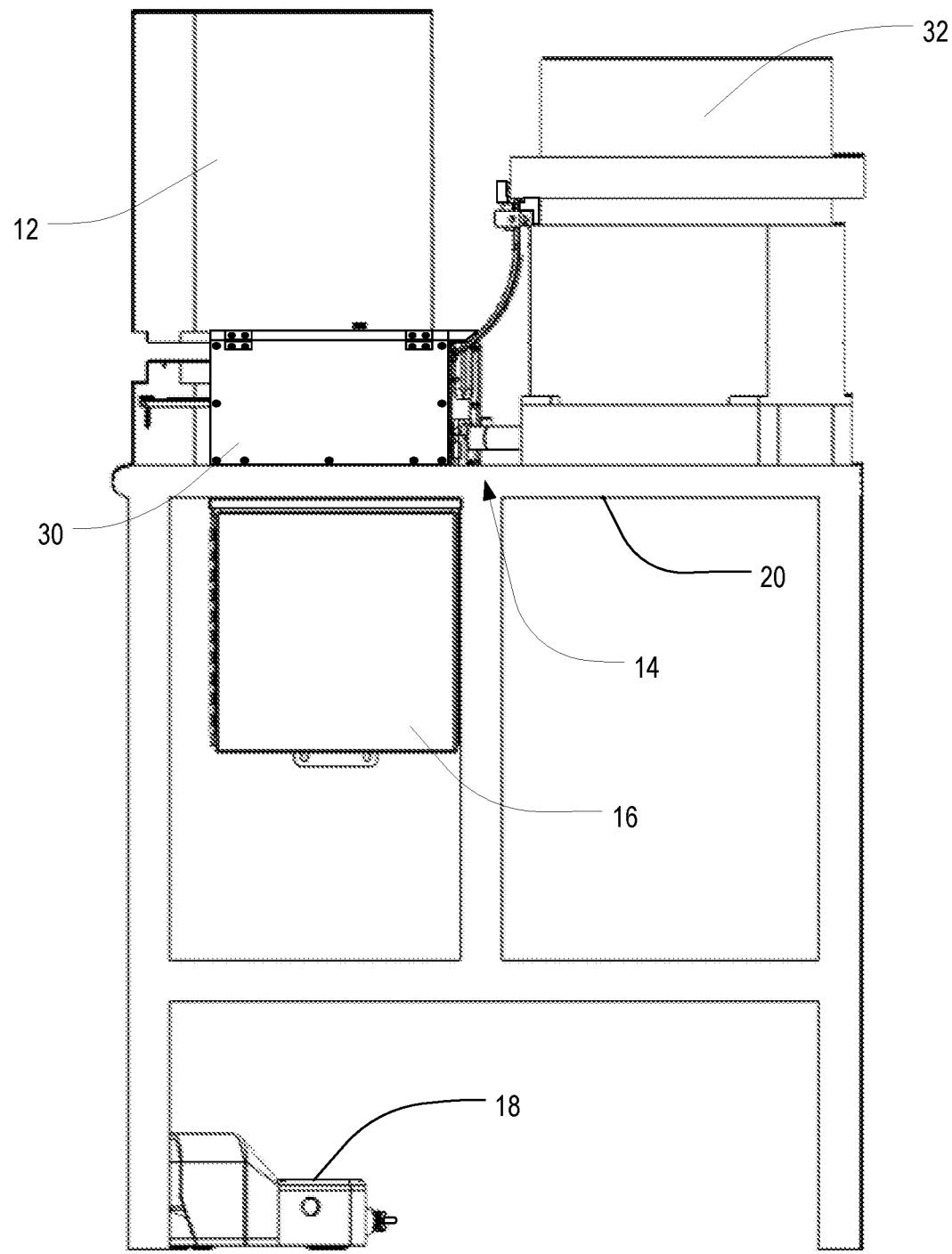
Figure 8:
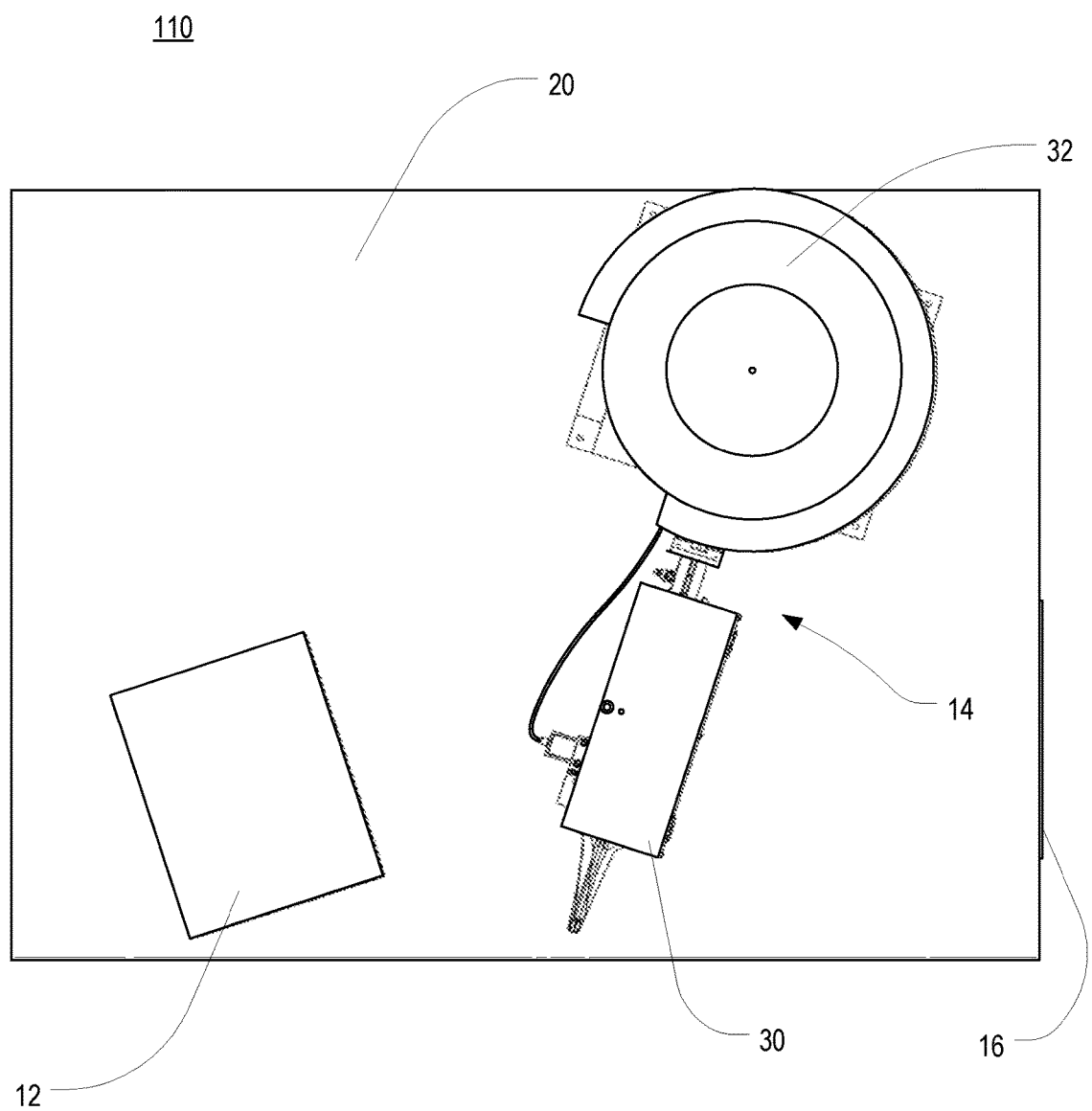

Another system 110 for preparing a length of slide fastener chain for operational use on an article in accordance with one or more aspects of the present invention is depicted in FIG. 5. FIGS. 6-8 are front, side, and top views, respectively, of the system 110 of FIG. 5. The system 110 of FIGS. 5-8 is generally the same as that of FIGS. 1-4 except that a configuration of the components of the system has been adjusted. In particular, the notching machine 12 and the slider body mounting machine 14 are angled toward one another so that a single user seated generally between the two machines has ready access to both merely by pivoting to the left or right. Such an arrangement can facilitate enhanced production workflow by eliminating the need for a user to move from one place to another in order to have access to both machines. Additionally, an electrical panel 16 that provides power to the system 110 is arranged at a side of the table 20 to facilitate operator access to controls of the system 110. It is contemplated that the system configuration can be set up as a "left-hand" or "right-hand" configuration depending on the direction of incoming materials and the direction of outgoing assembled product.

Generally, the systems 10,110 of FIGS. 1-8 can be arranged in any of a variety of different configurations to suit specific needs. Functionality of the systems, including the notching machine 12 and the slider body mounting machine 14, is consistent between the systems 10,110. It is contemplated that the notching machine 12 and the slider body mounting machine 14 are independently operable and are used in combination with one another to prepare a length of slide fastener chain for operational use on an end-use article. Furthermore, it is contemplated that each of the notching machine 12 and the slider body mounting machine 14 are configured in a way that provides an operator with sufficient clearance to accommodate a cut length of slide fastener chain that has already been attached to an end-use article, such as a mattress cover.

With further reference to FIGS. 1-8, a system 10,110 for preparing a length of slide fastener chain for operational use utilizes the notching machine 12 to make the slider body mounting operation much easier. The notching step provides a notch or gap at an end of the length of slide fastener chain in the correct orientation for accommodation of the mouth of a slider body. The notching machine 12 includes a mechanical punch press assembly 25 that is situated within a wide channel of the notching machine 12. In this manner, the notching machine 12 is configured to be able to accommodate both the slide fastener chain and any accompanying material (such as a mattress cover or other article) to which the slide fastener chain is secured. The material can itself be maneuvered into or through the wide channel of the notching machine 12 so that an end of the slide fastener chain can be notched using the mechanical punch press assembly 25.

In one contemplated embodiment, the notching machine 12 is configured to receive the end of the slide fastener chain and mechanically cut and remove several heads of coupling elements, or teeth, that are positioned at the end of the length of slide fastener chain without damage to other slide fastener chain components. In another contemplated embodiment, the notching machine 12 is configured to receive the end of the slide fastener chain and mechanically cut and remove several entire coupling elements, or teeth, that are positioned at the end of the length of slide fastener chain without damage to other slide fastener chain components.

It is contemplated that removal of the coupling element heads or entire coupling elements can be accomplished by automation or manually. In the system of FIGS. 1-8, a cut length of slide fastener chain is positioned manually in the mechanical punch press assembly 25 by an operator and pushed forward until it reaches a physical stop. In an embodiment where coupling heads are removed (rather than entire coupling elements), it is contemplated that the remaining portion of the coupling elements should remain intact, irrespective of whether the length of slide fastener chain is notched automatically or manually. In this manner, sewing threads that are used to secure the coupling elements to the slide fastener tape (as is common for slide fasteners with coil-type teeth) are not damaged.

Figure 9:
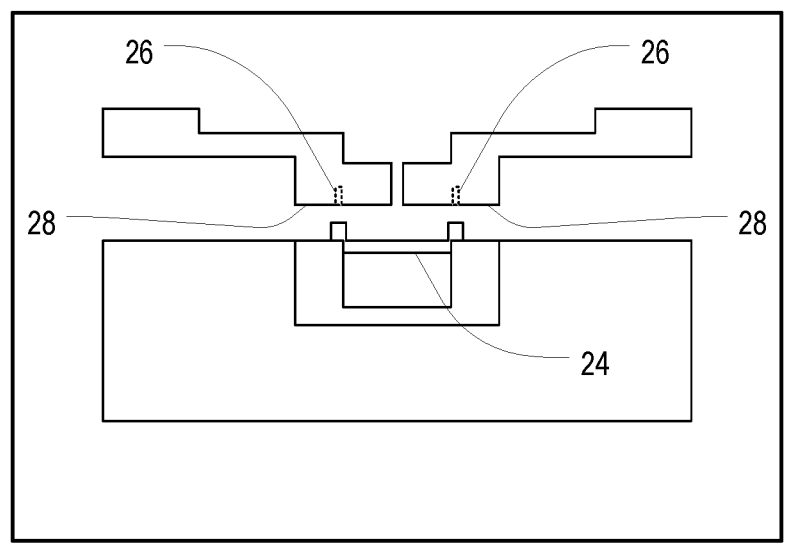
FIG. 9 is a schematic front view of a mechanical punch press of a notching machine in accordance with the systems of FIGS. 1 and 5.
Figure 13B:
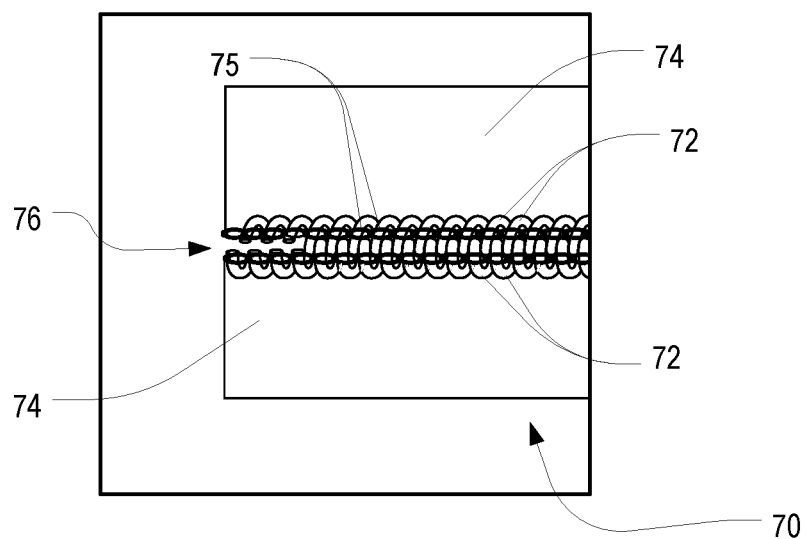
FIG. 13B is a top view of the end of the cut length of slide fastener chain of FIG. 13A after notching.
Figure 13C:
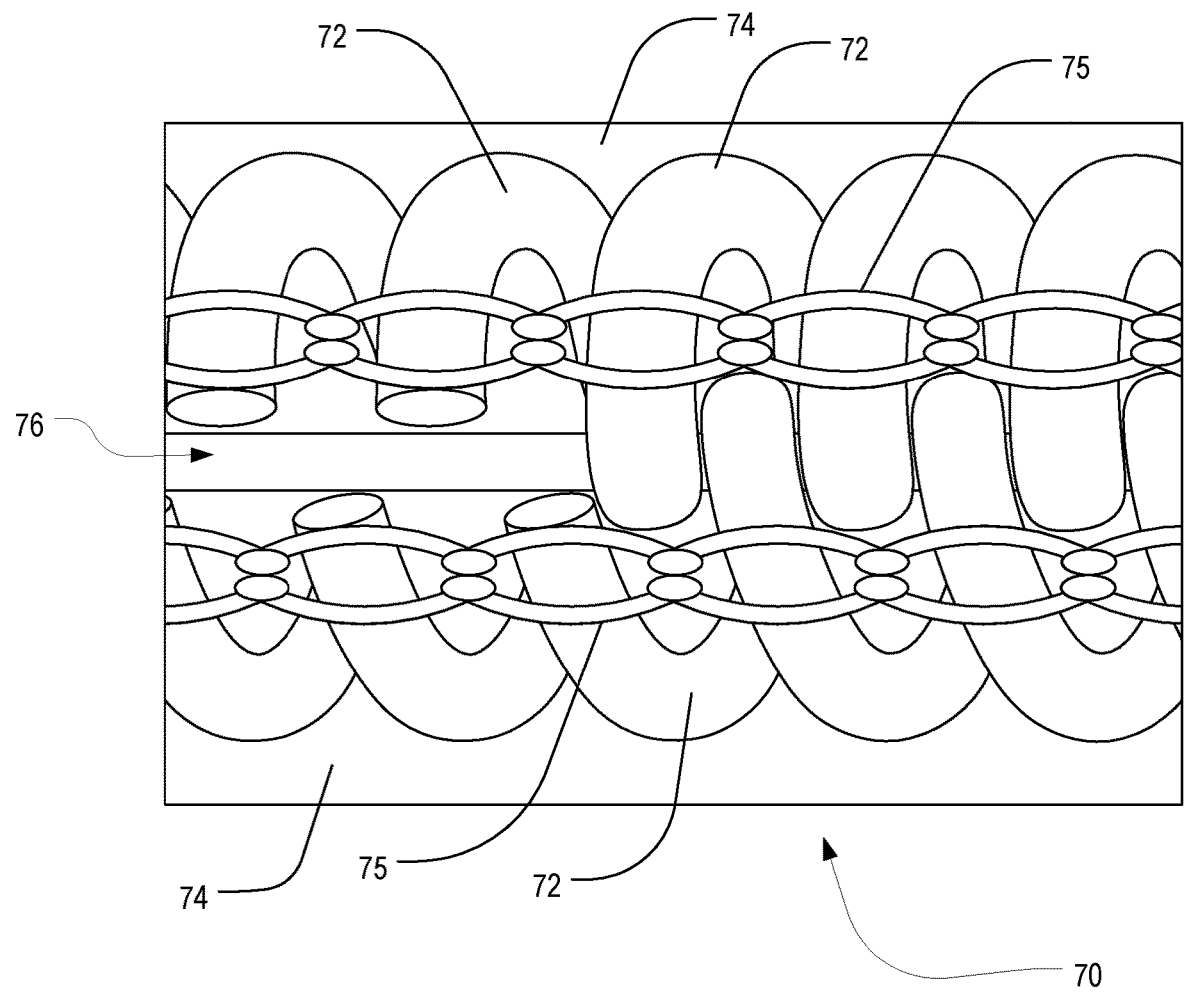
FIG. 13C is a close-up top view of the end of the notched cut length of slide fastener chain of FIG. 13B.
Figure 14B:
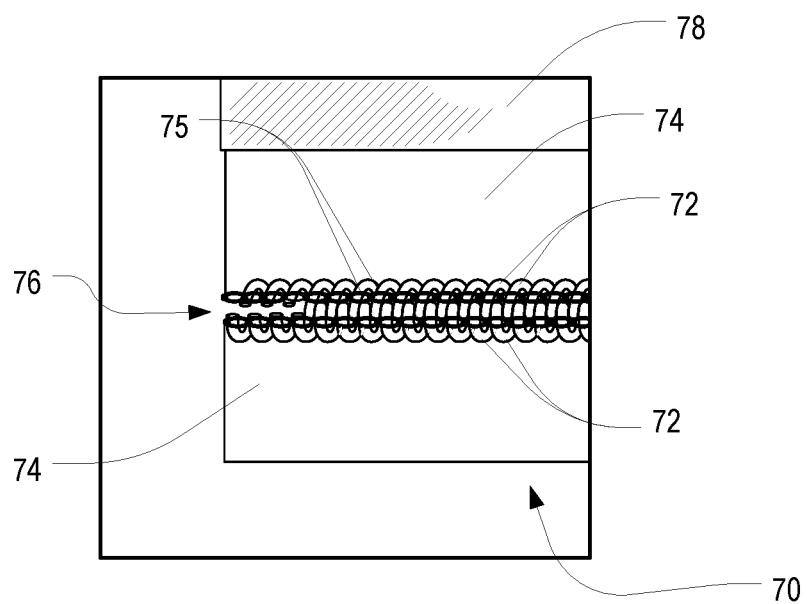
FIG. 14B is a top view of the end of the cut length of slide fastener chain of FIG. 14A after notching.

In some contemplated embodiments, the mechanical punch press assembly follows a two-stage mechanical process. FIG. 9 is a schematic front view of a mechanical punch press assembly 25 of a notching machine 12 in accordance with the systems of FIGS. 1 and 5. As depicted in FIG. 9, the mechanical punch press assembly 25 includes a notching punch 26 and a cutting die 24. Additionally, a spring-loaded pad 28 is arranged at each side of the notching punch 26. During operation, the spring-loaded pads 28 clamp down on the slide fastener tapes to hold the cut end of the length of slide fastener chain securely in a proper position for notching. Once the length of slide fastener chain is properly positioned in the cutting die 24 and clamped with the spring-loaded pads 28, the punch 26 is actuated. Actuation of the punch 26 cuts out a notch pattern at the end of the length of slide fastener chain by removing coupling heads of a quantity of coupling elements (as shown in FIGS. 13B, 13C, and 14B) or by removing entire coupling elements (as shown in FIGS. 15B and 16B). Coupling element modification or removal at one end creates a notch at the end of the length of slide fastener chain, a purpose of which is to create a cavity in the coupling heads for receipt of a slider body. In particular, the notching operation creates a space for the cut end of the slide fastener chain to be staged around the post of a slider body to be mounted on the slide fastener chain. In a contemplated embodiment, four coupling heads of each row of teeth are removed by the punch 26, although it is further contemplated that the notching machine 12 can be configured to remove more or fewer coupling heads.

In at least some embodiments, the foot pedal 18 is used to trigger or actuate the punch 26. The foot pedal 18 allows the operator to have both hands free to manipulate the slide fastener chain. In this regard, the foot pedal 18 facilitates an operator having the ability to move the notched end of the slide fastener chain form the notching machine to the slider body mounting machine. It is contemplated that the operator can maintain the same or a similar grip on the left-hand and right-hand slide fastener tapes of the slide fastener chain throughout both operations.

With further reference to FIGS. 1-8, a system 10,110 for preparing a length of slide fastener chain for operational use utilizes the slider body mounting machine 14 to orient a slider body for mounting to the notched end of the length of slide fastener chain. The slider body mounting machine 14 orients slider bodies from a vibratory feed container 32 onto a slider body positioning mechanism 30. Generally, during operation of the slider body mounting machine 14, a slider body is positioned and properly oriented at the end of the slider body positioning mechanism 30 and is fixed securely in preparation for a notched length of slide fastener chain to be inserted. The notched end of the slide fastener chain is inserted into a mouth end of the slider body. The slide fastener chain is then pulled through the slider body by a distance sufficient to mount the slider body to the teeth of the slide fastener chain. The slide fastener chain, with slider body mounted, can then be removed from the slider body positioning mechanism 30. At this point, the slider body is ready to be maneuvered to bring the rows of teeth into or out of interlocking arrangement to close or open the slide fastener.

Figure 10:
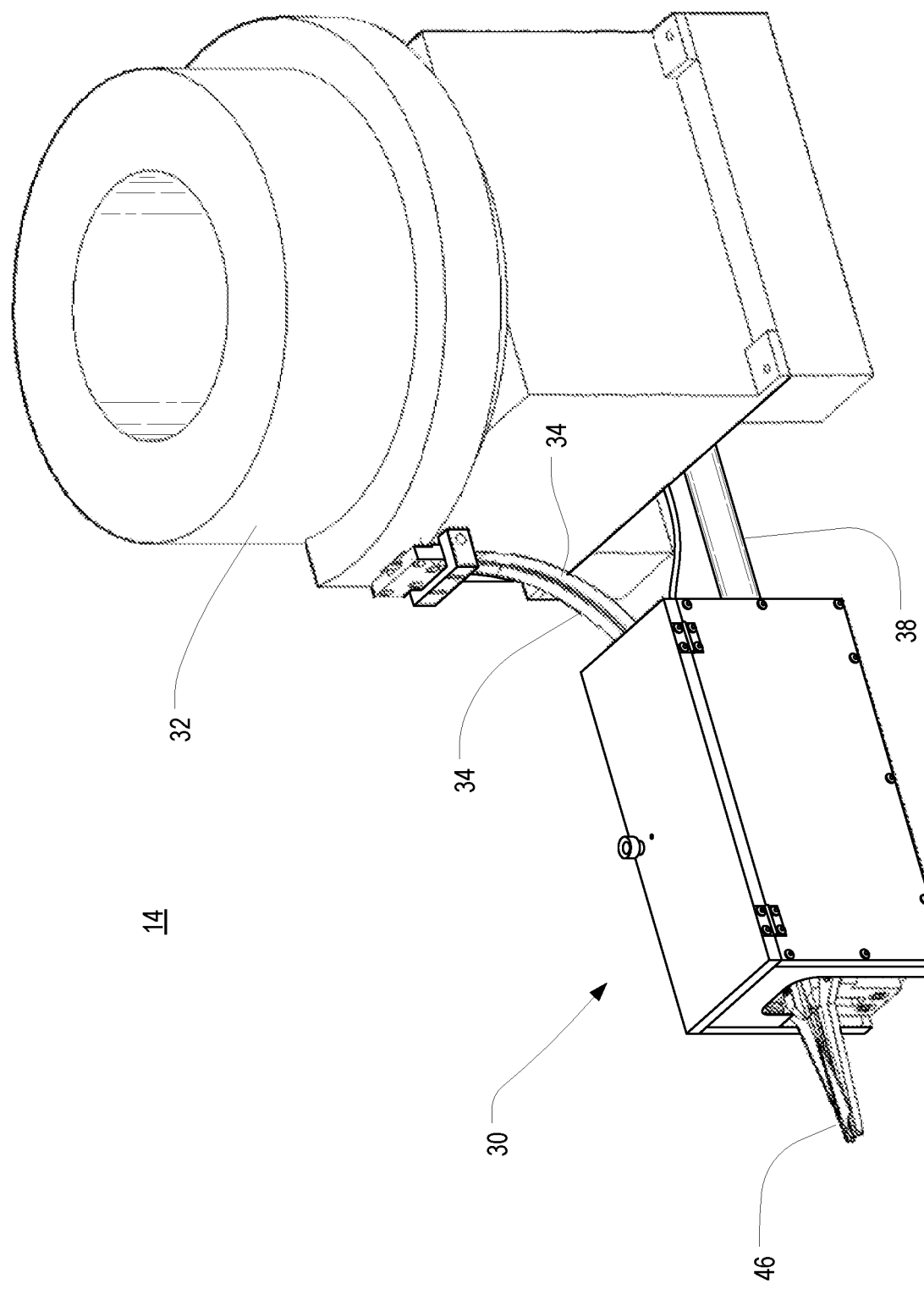
FIG. 10 is an orthogonal view of a slider body mounting machine in accordance with the systems of FIGS. 1 and 5.

FIG. 10 is an orthogonal view of a slider body mounting machine 14 in accordance with the systems of FIGS. 1 and 5. The slider body mounting machine 14 includes a vibratory feed container 32 and a slider body positioning mechanism 30 that operate together to feed slider bodies and orient them properly for mounting on a notched length of slide fastener chain. During operation of the slider body mounting machine 14, the vibratory feed container 32 uses mechanical vibration to feed and orient slider bodies in such a way that they drop onto a pair of escapement guide rails 34.

Figure 11:
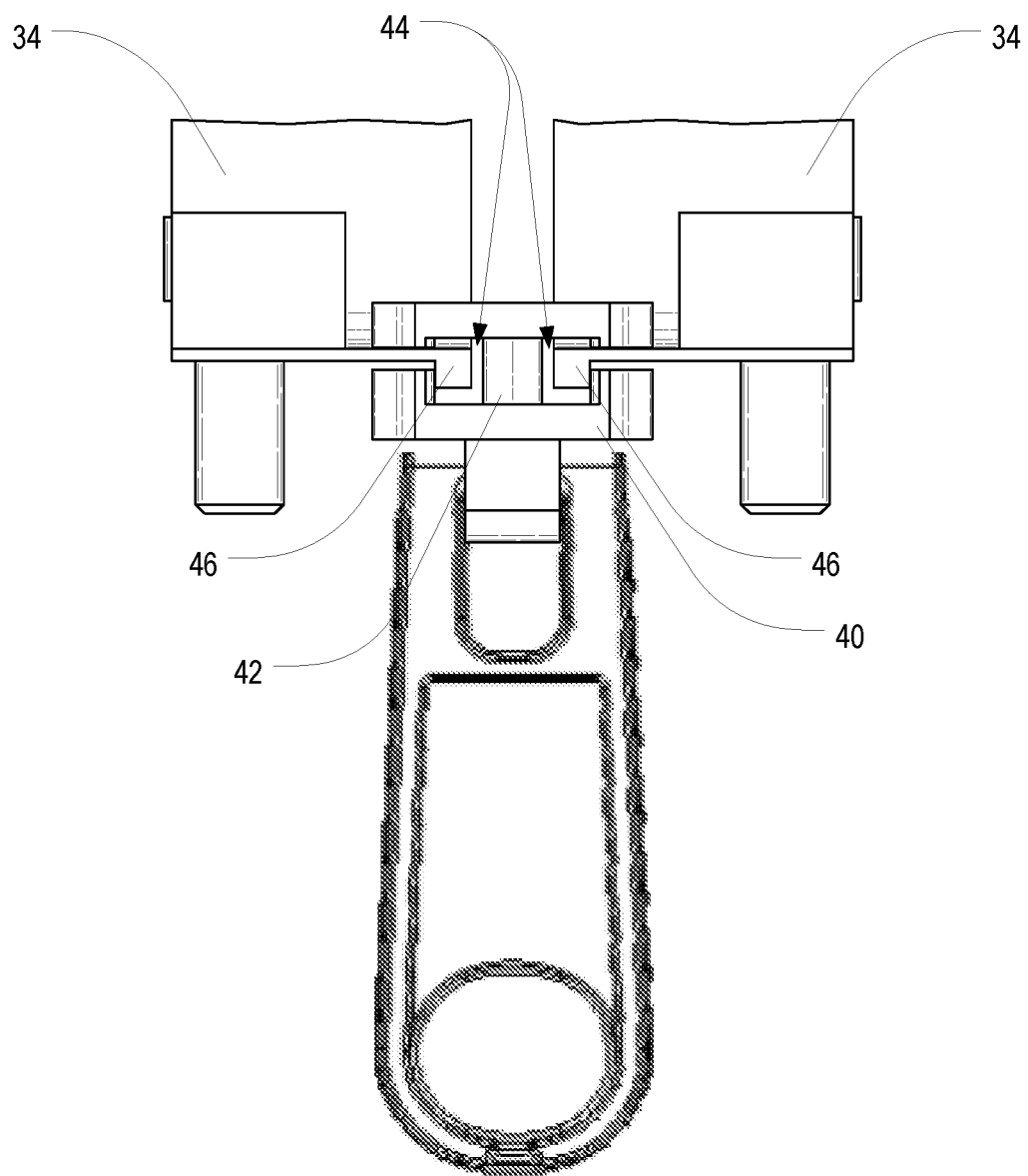
FIG. 11 is a close-up end view of a pair of escapement guide rails of the slider body mounting machine of FIG. 10, shown with a slider body suspended therefrom.

FIG. 11 is a close-up end view of the pair of escapement guide rails 34 of the slider body mounting machine 14 of FIG. 10, shown with a slider body 40 suspended therefrom. As shown in FIG. 11, each escapement guide rail 34 includes an interior-facing flanged edge 46 that extends through a respective tape slot 44 of the slider body 40. The central post 42 of the slider body is positioned between the guide rails 34 thereby facilitating proper alignment of each slider body while being maneuvered from the vibratory feed container 32. Slider bodies 40 are gravity-fed down the guide rails 34 until they are prevented from further movement at a spring-loaded stop. Here, the slider bodies are allowed to stack up adjacent to one another along the length of the escapement guide rails 34. If the escapement guide rails 34 become fully loaded with slider bodies, a photoelectric sensor is activated. Upon activation of the sensor, the vibratory feed container 32 is powered down to stop feeding additional slider bodies.

Figure 12A:
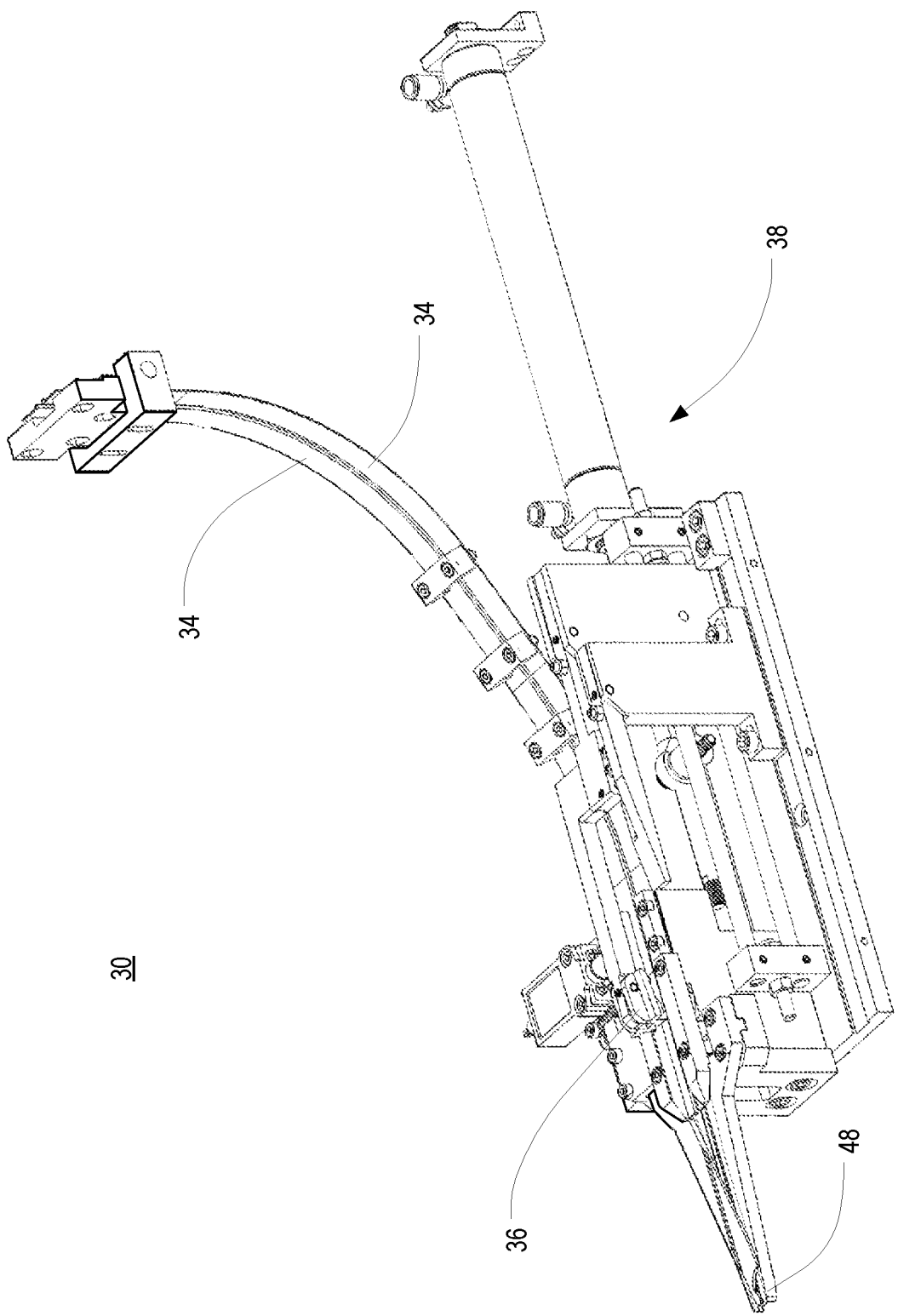
FIG. 12A is an orthogonal view of a slider body positioning mechanism of the slider body mounting machine of FIG. 10, shown with a cover removed.
Figure 12B:
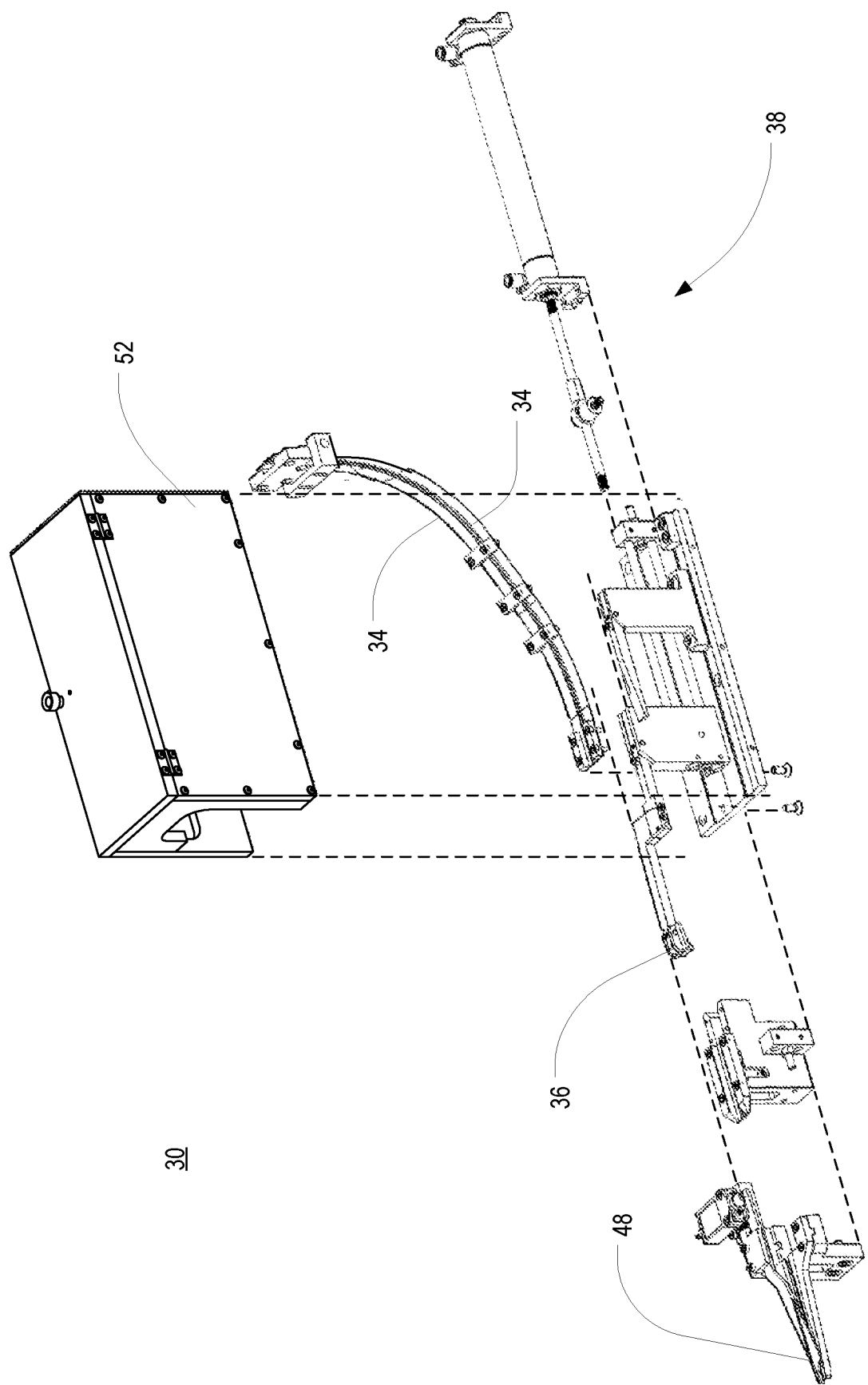
FIG. 12B is an orthogonal exploded view of the slider body positioning mechanism of FIG. 12A, shown with a cover.

FIG. 12A is an orthogonal view of a slider body positioning mechanism 30 of the slider body mounting machine 14 of FIG. 10, shown with a cover removed, and FIG. 12B is an orthogonal exploded view of the slider body positioning mechanism 30 of FIG. 12A, shown with a cover 52. The slider body positioning mechanism 30 includes a pneumatic actuator 38 that operates to maneuver slider bodies, one at a time, from behind the stop toward a spring-loaded nest 48 at a distal end of the slider body positioning mechanism 30. It is contemplated that a cover 52 can be situated over some or all of the components of the slider body positioning mechanism 30. The cover 52 functions as a safety guard to keep an operator safe from the mechanism when in operation. It is contemplated that the cover 52 can be made from a transparent material, such as a clear plastic material, so that an operator can view the slider body positioning mechanism 30 when in use.

Figure 12C:
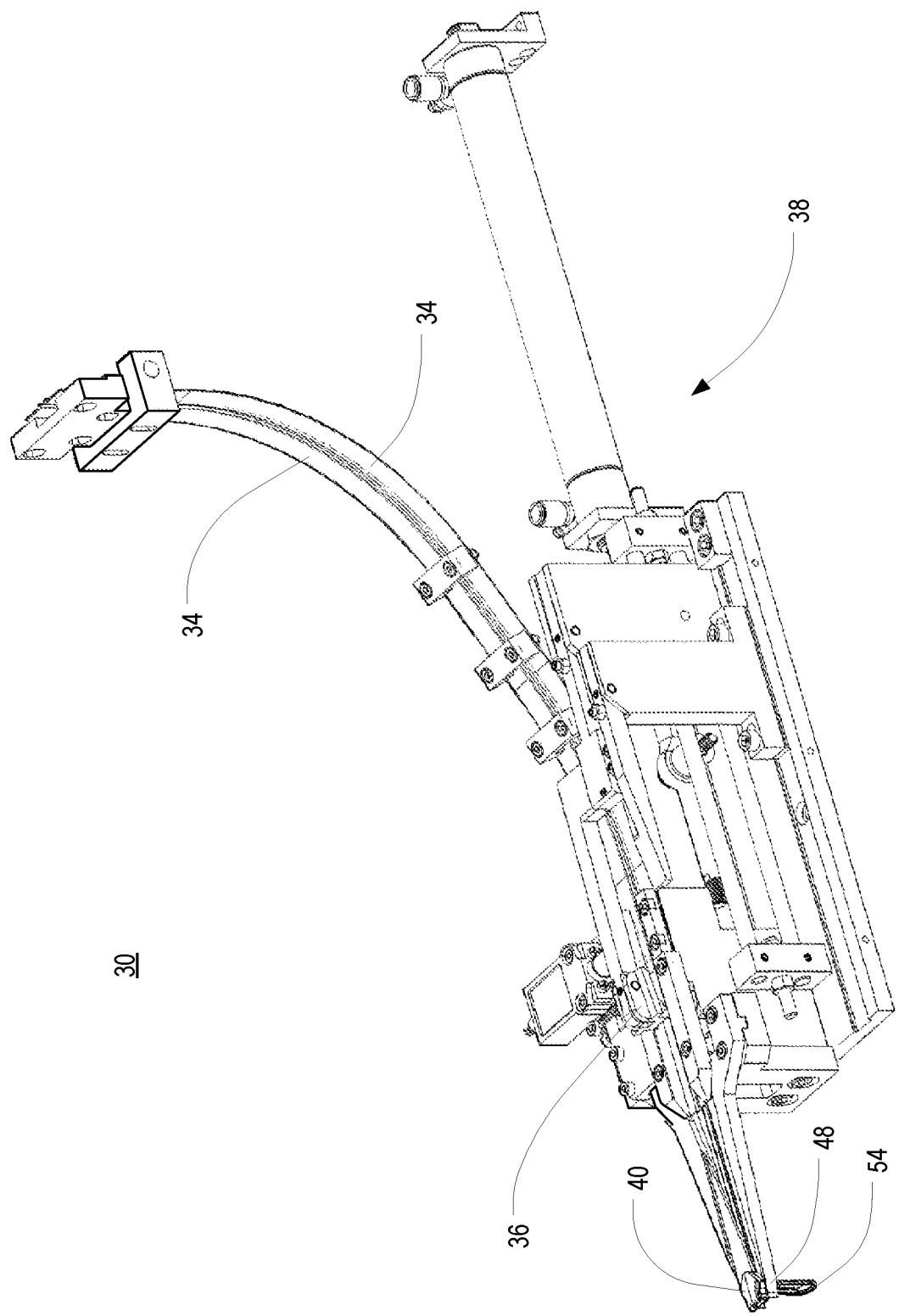
FIG. 12C is an orthogonal view of the slider body positioning mechanism of FIG. 12A, shown with a slider body in a spring-loaded nest.
Figure 12D:
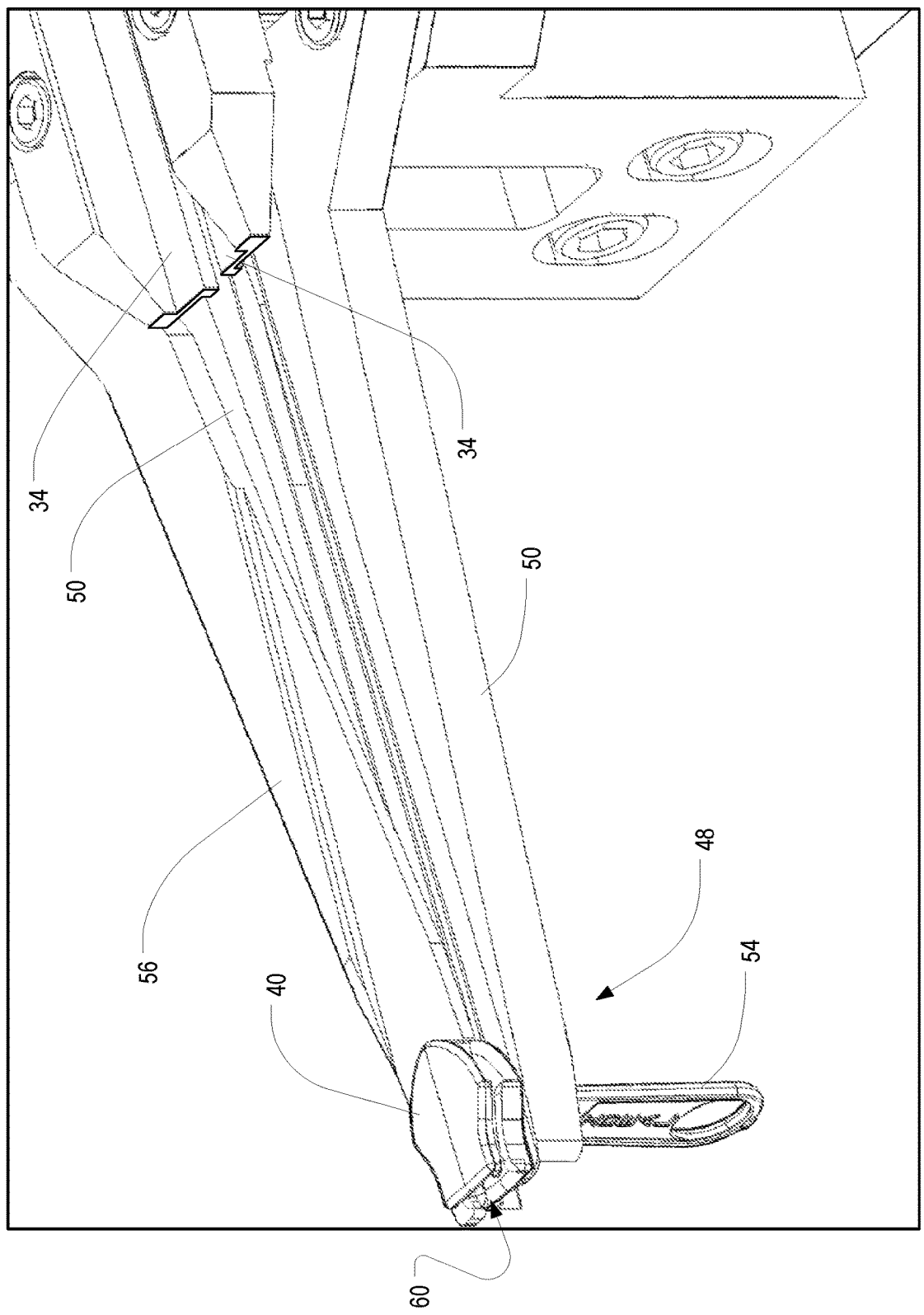
FIG. 12D is a close-up orthogonal view of the slider body positioning mechanism and slider body of FIG. 12C.

FIG. 12C is an orthogonal view of the slider body positioning mechanism 30 of FIG. 12A, shown with a slider body 40 in a spring-loaded nest 48, and FIG. 12D is a close-up orthogonal view of the slider body positioning mechanism 30 and slider body 40 of FIG. 12C. In operation, the pneumatic actuator 38 is retracted and pulls a spring-loaded pusher knuckle 36 over the first slider body along the escapement guide rails 34 until it snaps behind the first slider body. The pneumatic actuator 38 then extends and pushes the slider body 40 forward past the spring-loaded stop, where the slider body is transferred from the escapement guide rails 34 to a different set of guide rails 50 that lead to the spring-loaded nest 48, as shown in FIG. 12D. This second set of guide rails 50 is positioned lower than the escapement guide rails 34 so that, upon transfer, the rails 50 are positioned at either side of the slider body 40 at the space between the pull tab 54 of the slider body 40 and the surface of the slider body from which the pull tab 54 extends. In this manner, the slider body 40 is retained in proper alignment, and the mouth 60 of the slider body 40 remains clear for receipt of a notched end of a length of slide fastener chain.

With the slider body 40 in position along the second set of guide rails 50, the pneumatic actuator 38 continues to extend forward until the slider body 40 is received at the spring-loaded nest 48, which holds the slider body firmly in place. In a contemplated embodiment, the slider body positioning mechanism 30 includes a locking arm 56 that is biased in favor of a position that secures a slider body 40 in the spring-loaded nest 48. When a slider body is maneuvered along the second set of rails 50, the locking arm is laterally shiftable, against a spring bias, to provide a clear pathway for the slider body 40 to be received at the nest 48. Once the slider body 40 arrives at the nest 48, the locking arm 56 springs back to a locked position and holds the slider body firmly in place in the nest 48. At the spring-loaded nest 48, the slider body 40 is positioned at an outermost end of the slider body positioning mechanism 30 and is close to an operator seated in front of the system 10,110. In this manner, an operator is provided with ready access to the positioned slider body 40. The slide fastener chain, and any accompanying material (such as a mattress cover or other article) to which the slide fastener chain is secured, can be maneuvered to the slider body 40 without interfering with the working components of the slider body mounting machine 14. Furthermore, the cover 52 can help to ensure that no part of any accompanying material comes into contact with the slider body positioning mechanism 30.

Once the slider body 40 is in the nest 48, as shown in FIGS. 12C and 12D, the pneumatic actuator 38 then retracts behind the next slider body in the gravity-fed escapement guide rails 34. The operator then inserts the notched end of the length of slide fastener chain into the mouth 60 of the slider body 40 and pulls the slide fastener chain though the mouth so that the slider body 40 is positioned a short distance along the length of slide fastener chain (as shown in FIGS. 13E, 14D, 15D and 16D). In a contemplated embodiment, the slider body is positioned several inches along the length of slide fastener chain. Once the slider body is mounted along the slide fastener chain, the operator pulls the assembled product free from the spring-loaded nest 48. It is contemplated that removing the slide fastener chain actuates a switch that triggers the pneumatic actuator 38 to automatically push the next slider body into the spring-loaded nest 48. The process can be repeated as many times as necessary so that a slider body is mounted on each notched length of slide fastener chain.

It is contemplated that the system 10,110 as described herein can be used to prepare a wide variety of slide fasteners for operational use on an article. Slide fastener types capable of preparation using the steps and methods described herein include, but are not limited to, coil-type teeth slide fasteners, metal teeth slide fasteners, and molded teeth slide fasteners.

With respect to any of these types of slide fasteners, it is contemplated that the system 10,110 can be used to prepare a length of slide fastener chain that has already been secured to an end-use article, such as a mattress cover. In such cases, it is contemplated that the length of slide fastener chain is sewn, bonded, or otherwise attached to corresponding edges of an article, and an end of the adhered slide fastener chain is then modified, using the notching machine 12, to accommodate a slider body that is mounted using the slider body mounting machine 14 (such as in FIGS. 14A-14D). Each of the notching machine 12 and slider body mounting machine 14 are configured in such a way as to provide clearance to accommodate both the slide fastener chain and the accompanying material to which the slide fastener chain is secured. In this manner, the material can itself be maneuvered into the tooling of the machines 12,14 so that the slide fastener chain can be notched and a slider body can be mounted onto the chain.

With respect to any of these types of slide fasteners, it is also contemplated that the system 10,110 can be used to prepare a length of loose slide fastener chain by mounting a slider body onto the chain (such as in FIGS. 13A-13E). The prepared length of loose slide fastener chain can then be sewn, bonded, or otherwise attached to a mattress cover or other articles or materials.

It is contemplated that steps and methods described herein provide an effective and efficient method of using continuous fastener chain and one or more slider bodies to manufacture mattress covers, or similar items, where a fastener is used to encircle the product and act as a closing device. In one or more embodiments, the systems and methods described herein eliminate the need for installing separating components and top stop components that are typically used in fully finished slide fasteners.

Installation of the slide fastener by mattress manufacturers and other manufacturers can vary by product design. Contemplated installation methods include a method where at least one edge of the slide fastener chain is secured to an end-use article prior to notching the slide fastener chain and mounting a slider body thereon using a system in accordance with the present invention. Contemplated installation methods also include a method where a loose slide fastener chain with a slider body mounted thereon, using a system in accordance with the present invention, is thereafter secured to an end-use article. In accordance with any of the aforementioned installation methods, it is contemplated that, in the case of a prepared length of slide fastener chain installed on a mattress cover, a method of securing the slide fastener to the mattress cover includes sewing across the fastener coils or tucking the edges of the slide fastener into the mattress cover fabric.

Figure 13A:
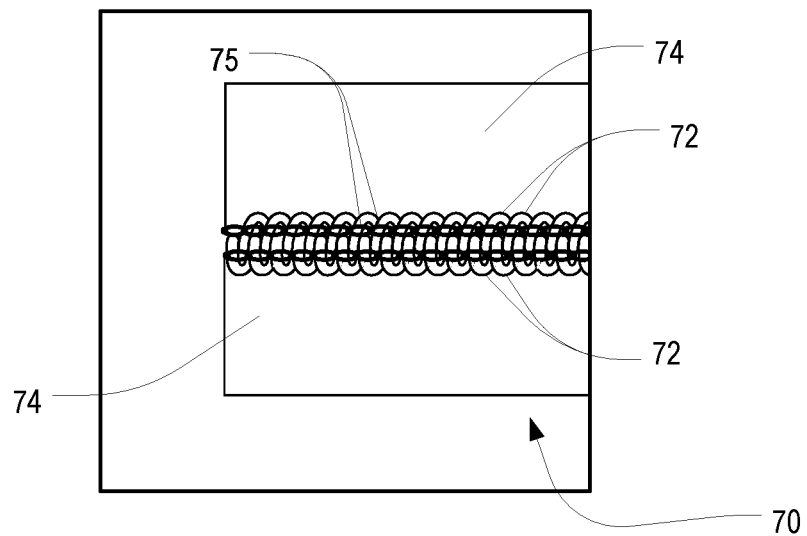
FIG. 13A is a top view of one end of a cut length of closed slide fastener chain having coil-type coupling elements.

FIG. 13A is a top view of one end of a cut length of closed slide fastener chain 70 having coil-type coupling elements 72. As shown in FIG. 13A, the cut length of closed slide fastener chain 70 includes two fully-interlocked rows of coil-type coupling elements 72. Each row is secured to a slide fastener tape 74 by sewing threads 75.

FIG. 13B is a top view of the end of the cut length of slide fastener chain 70 of FIG. 13A after notching via the notching machine 12 of FIGS. 1-8, and FIG. 13C is a close-up top view of the end of the notched cut length of slide fastener chain 70 of FIG. 13B. The notching step provides a notch or gap 76 at the end of the length of slide fastener chain in the correct orientation for accommodation of the mouth of a slider body. Here, the notching step removes the interlocking portion (i.e., the heads) of a quantity of coil-type coupling elements 72 at the end of the cut length of slide fastener chain 70, as perhaps best seen in FIG. 13C. The remaining portions of the slide fastener coupling elements remain intact. For coil-type coupling elements, removing only the heads of coupling elements 72 helps to ensure that sewing threads 75 are not damaged. It is further contemplated that other types of slide fastener chain, including those with metal teeth or molded teeth, can be notched in this same manner (i.e., by removing only the heads of coupling elements). In a contemplated embodiment, about four heads of each row of coupling elements 72 are removed, although it is contemplated that the notching machine 12 can be configured to remove more or fewer coupling heads. Notching the end of the cut length of slide fastener chain 70 creates a space 76 for the cut end of the slide fastener chain 70 to be staged around the post of a slider body to be mounted thereon.

Figure 13D:
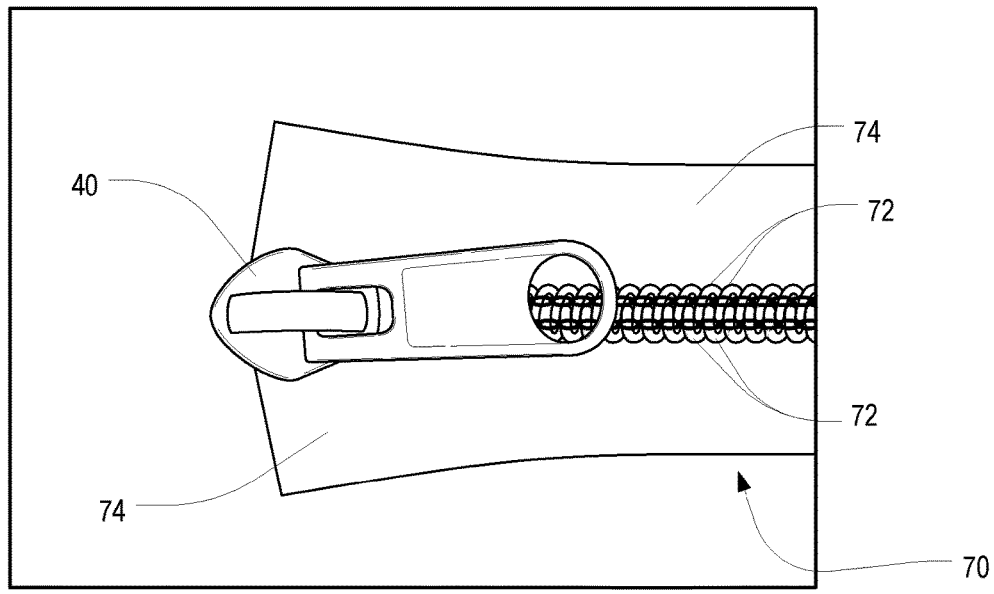
FIG. 13D is a top view of the end of the cut length of slide fastener chain of FIG. 13B, shown with a slider body introduced at the notched end.
Figure 13E:
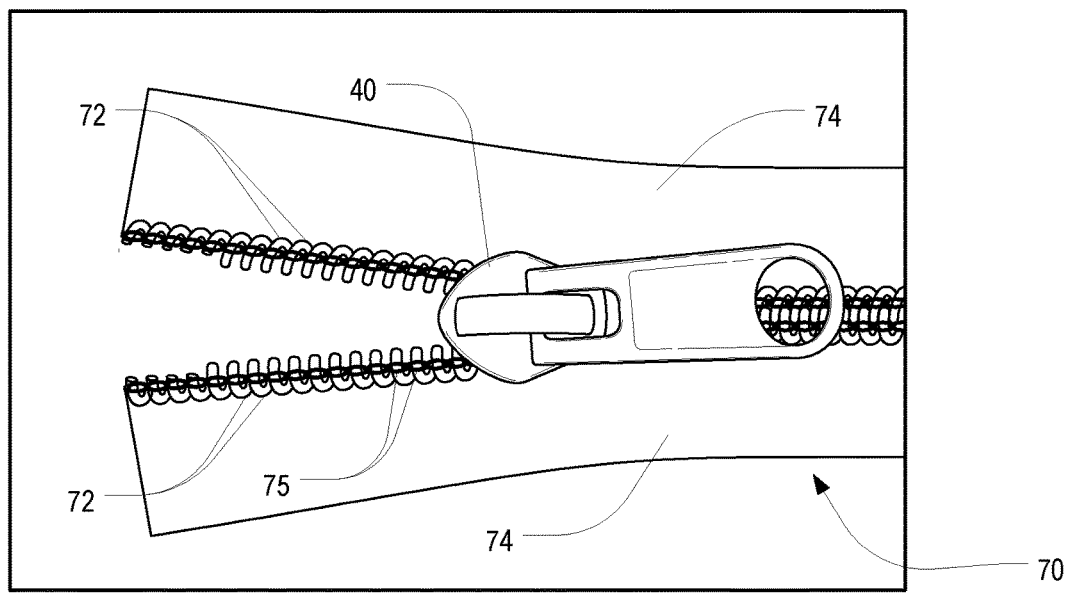
FIG. 13E is a top view of the end of the cut length of slide fastener chain of FIG. 13D, shown with the slider body mounted on the slide fastener chain.

FIG. 13D is a top view of the end of the cut length of slide fastener chain 70 of FIG. 13B, shown with a slider body 40 introduced at the notched end. The slider body mounting machine 14 of FIGS. 1-8 can be used to orient the slider body 40 and firmly retain the slider body in a fixed position for mounting. As shown in FIG. 13D, the notched end of the length of slide fastener chain 70 is inserted into the mouth of the slider body 40 so that the post of the slider body 40 is situated in the notch 76 created by the notching machine 12. FIG. 13E is a top view of the end of the cut length of slide fastener chain 70 of FIG. 13D, shown with the slider body 40 mounted on the slide fastener chain 70. As shown in FIG. 13E, the cut length of slide fastener chain 70 has been pulled through the mouth of the slider body 40 by a short distance, thereby mounting the slider body 40 onto the rows of coil-type coupling elements 72. Once mounted, the slider body 40 is maneuverable to open or close the stringer halves by bringing the rows of coil-type coupling elements 72 into or out of interlocking arrangement, and the slide fastener chain 70 is ready for operational use.

Figure 14A:
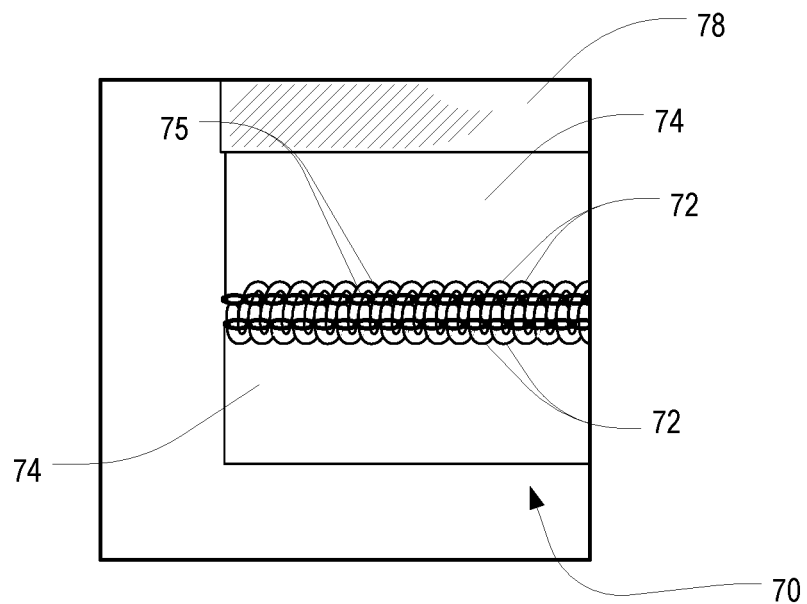
FIG. 14A is a top view of one end of the cut length of closed slide fastener chain of FIG. 13A, shown secured to a portion of a mattress cover.

FIG. 14A is a top view of one end of the cut length of closed slide fastener chain 70 of FIG. 13A, shown secured to a portion of a mattress cover 78. Here, the cut length of closed slide fastener chain 70 having coil-type coupling elements 72 is shown already secured to a corresponding length of a mattress cover portion 78. Each of the notching machine 12 and slider body mounting machine 14 are configured in such a way as to provide clearance to accommodate both the slide fastener chain and the accompanying material 78 to which the slide fastener chain is secured. In this manner, the material 78 can itself be maneuvered into the tooling of the machines 12,14 so that the slide fastener chain can be notched and a slider body can be mounted onto the chain.

FIG. 14B is a top view of the end of the cut length of slide fastener chain 70 of FIG. 14A after notching. The notching step provides a notch or gap 76 at the end of the length of slide fastener chain in the correct orientation for accommodation of the mouth of a slider body. Here, the notching step removes the interlocking portion (i.e., the heads) of a quantity of coil-type coupling elements 72 at the end of the cut length of slide fastener chain 70. Notching the end of the cut length of slide fastener chain 70 creates a space 76 for the cut end of the slide fastener chain 70 to be staged around the post of a slider body to be mounted thereon.

Figure 14C:
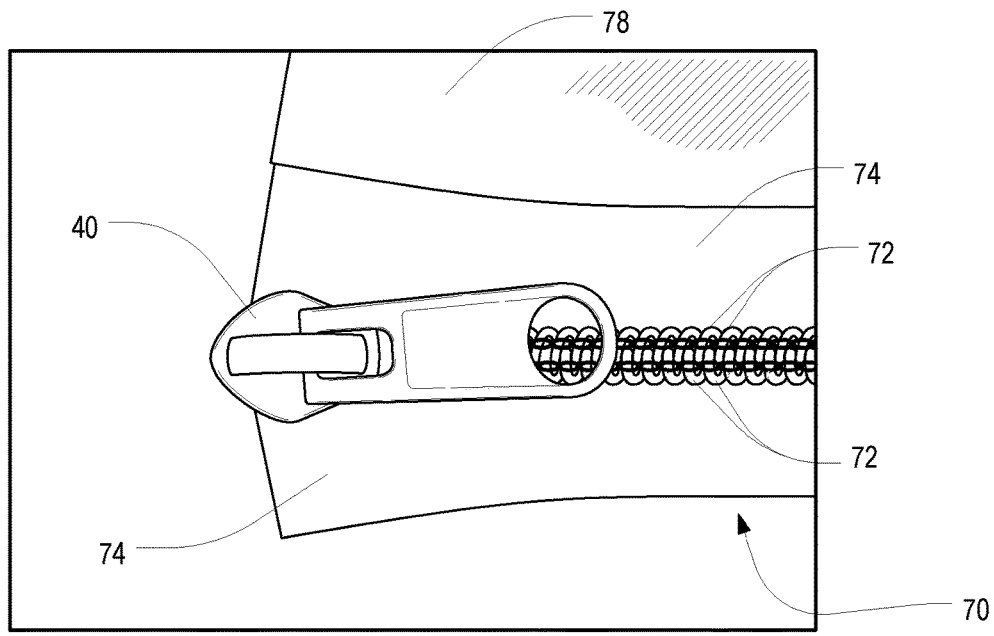
FIG. 14C is a top view of the end of the cut length of slide fastener chain of FIG. 14B, shown with a slider body introduced at the notched end.
Figure 14D:
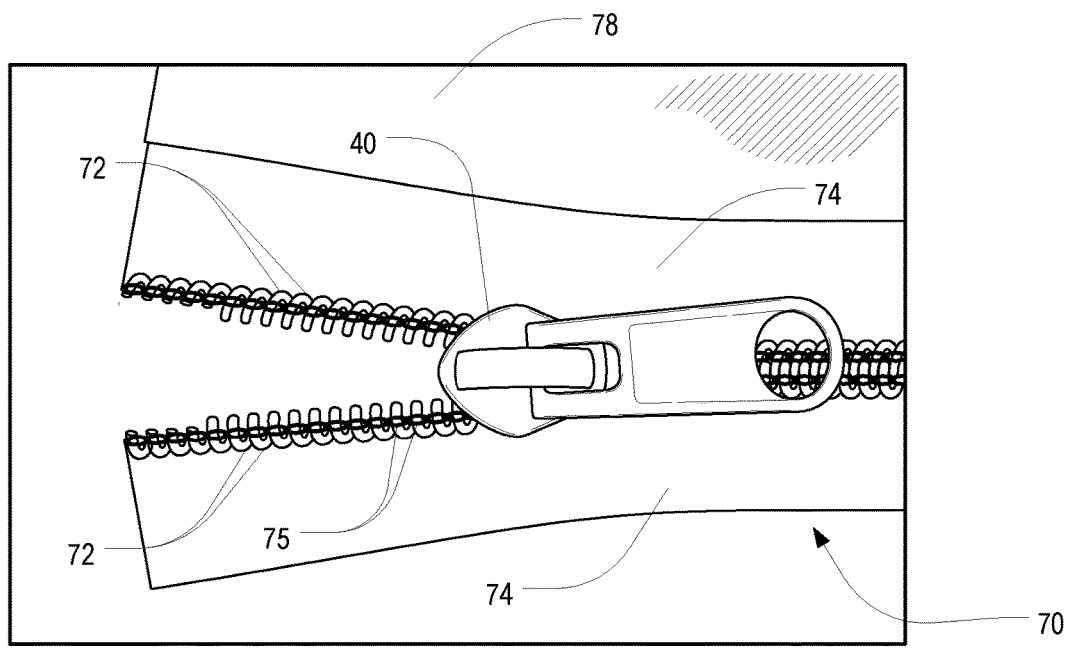
FIG. 14D is a top view of the end of the cut length of slide fastener chain of FIG. 14D, shown with the slider body mounted on the slide fastener chain.

FIG. 14C is a top view of the end of the cut length of slide fastener chain 70 of FIG. 14B, shown with a slider body 40 introduced at the notched end. The slider body mounting machine 14 of FIGS. 1-8 can be used to orient the slider body 40 and firmly retain the slider body in a fixed position for mounting, while providing clearance for receipt of the mattress cover portion 78 with attached slide fastener chain 70. FIG. 14D is a top view of the end of the cut length of slide fastener chain 70 of FIG. 14D, shown with the slider body 40 mounted on the slide fastener chain 70. As shown in FIG. 14D, the cut length of slide fastener chain 70 has been pulled through the mouth of the slider body 40 by a short distance, thereby mounting the slider body 40 onto the rows of coil-type coupling elements 72. Once mounted, the slider body 40 is maneuverable to open or close the stringer halves by bringing the rows of coil-type coupling elements 72 into or out of interlocking arrangement, and the slide fastener chain 70 is ready for operational use.

Figure 15A:
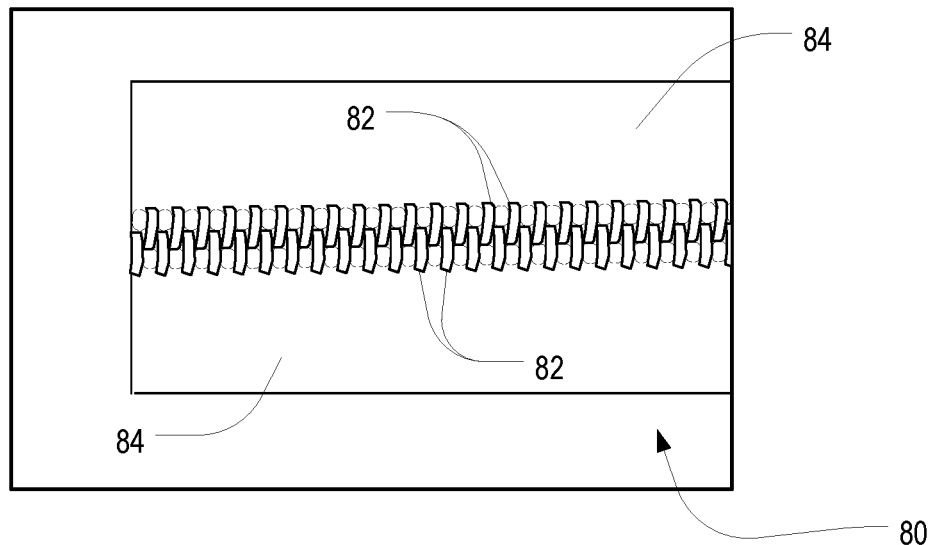
FIG. 15A is a top view of one end of a cut length of closed slide fastener chain having metal coupling elements.
Figure 15B:
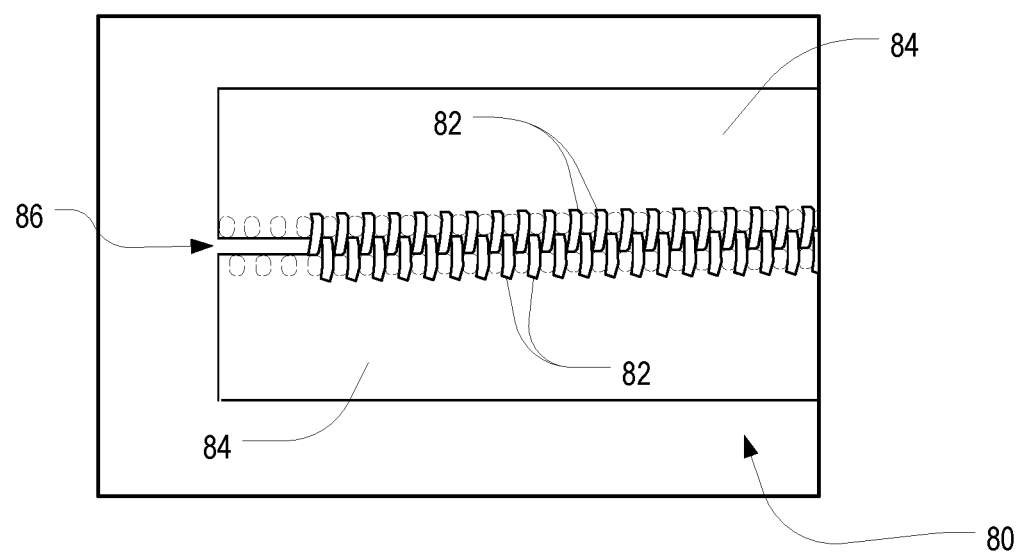
FIG. 15B is a top view of the end of the cut length of slide fastener chain of FIG. 15A after notching.

FIG. 15A is a top view of one end of a cut length of closed slide fastener chain 80 having metal coupling elements 82. As shown in FIG. 15A, the cut length of closed slide fastener chain 80 includes two fully-interlocked rows of metal coupling elements 82. Each row is staked or otherwise secured to a slide fastener tape 84.

FIG. 15B is a top view of the end of the cut length of slide fastener chain 80 of FIG. 15A after notching. The notching step provides a notch or gap 86 at the end of the length of slide fastener chain in the correct orientation for accommodation of the mouth of a slider body. Here, the notching step removes a quantity of metal coupling elements 82 at the end of the cut length of slide fastener chain 80. Notching the end of the cut length of slide fastener chain 80 creates a space 86 for the cut end of the slide fastener chain 80 to be staged around the post of a slider body to be mounted thereon.

Figure 15C:
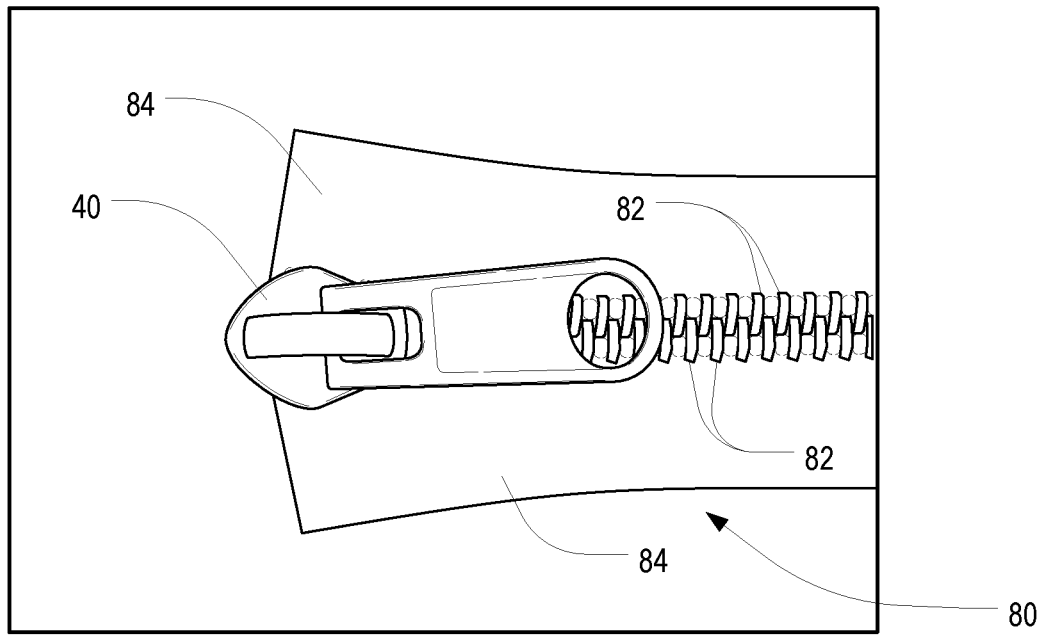
FIG. 15C is a top view of the end of the cut length of slide fastener chain of FIG. 15B, shown with a slider body introduced at the notched end.
Figure 15D:
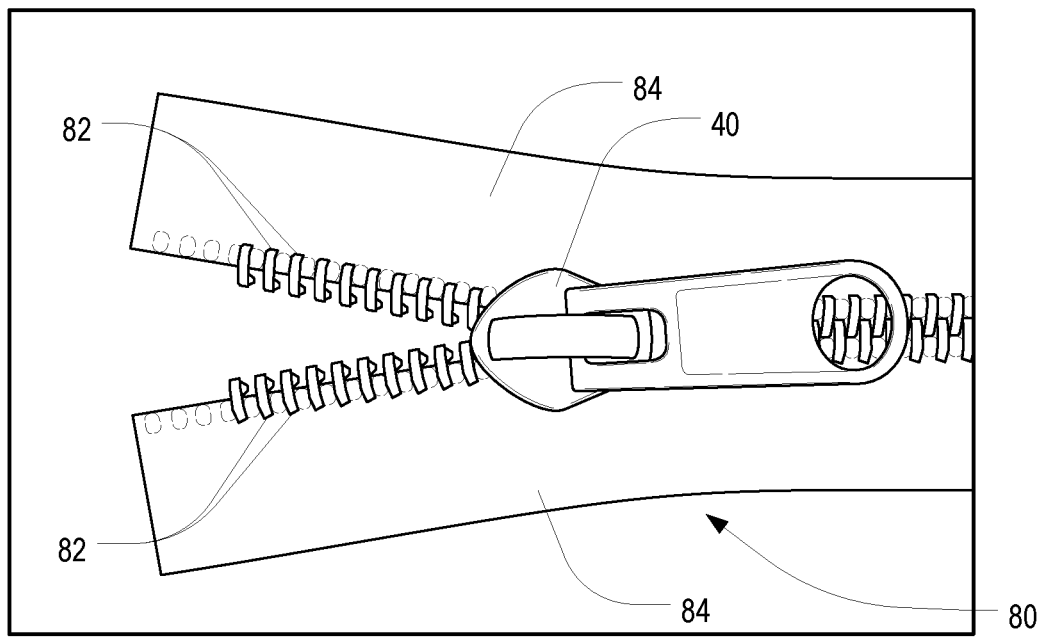
FIG. 15D is a top view of the end of the cut length of slide fastener chain of FIG. 15C, shown with the slider body mounted on the slide fastener chain.

FIG. 15C is a top view of the end of the cut length of slide fastener chain 80 of FIG. 15B, shown with a slider body 40 introduced at the notched end. As shown in FIG. 15C, the notched end of the length of slide fastener chain 80 is inserted into the mouth of the slider body 40 so that the post of the slider body 40 is situated in the notch 86. FIG. 15D is a top view of the end of the cut length of slide fastener chain 80 of FIG. 15C, shown with the slider body 40 mounted on the slide fastener chain 80. As shown in FIG. 15D, the cut length of slide fastener chain 80 has been pulled through the mouth of the slider body 40 by a short distance, thereby mounting the slider body 40 onto the rows of metal coupling elements 82. Once mounted, the slider body 40 is maneuverable to open or close the stringer halves by bringing the rows of metal coupling elements 82 into or out of interlocking arrangement, and the slide fastener chain 80 is ready for operational use.

Figure 16A:
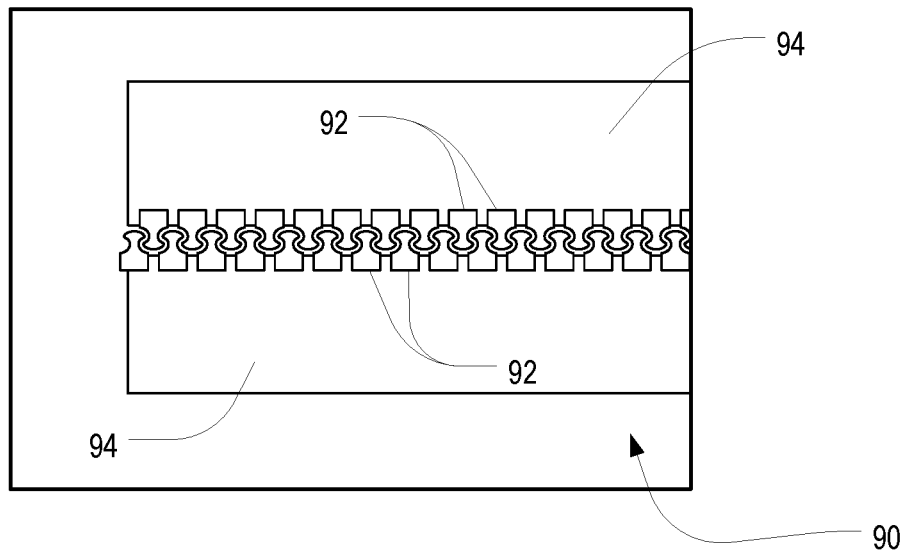
FIG. 16A is a top view of one end of a cut length of closed slide fastener chain having molded coupling elements.
Figure 16B:
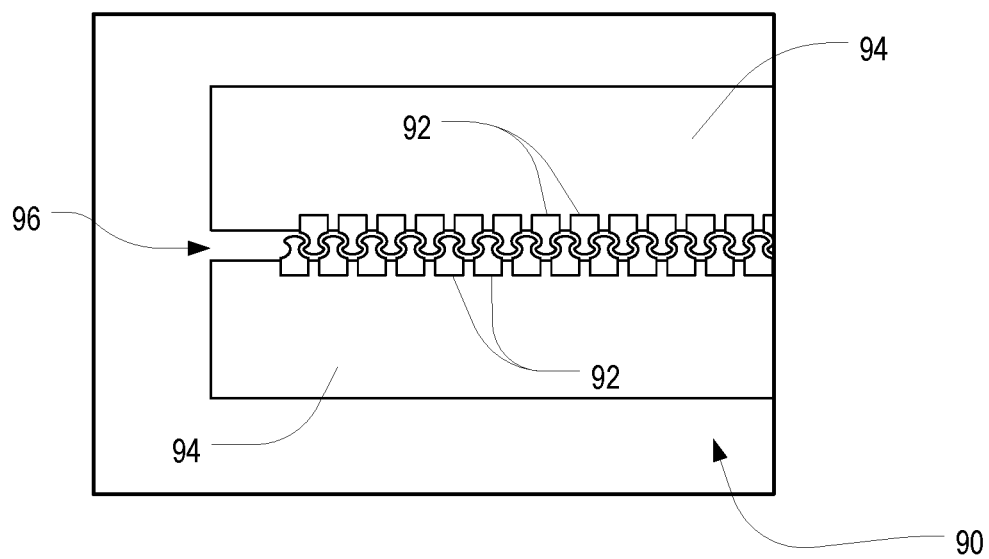
FIG. 16B is a top view of the end of the cut length of slide fastener chain of FIG. 16A after notching.

FIG. 16A is a top view of one end of a cut length of closed slide fastener chain 90 having molded coupling elements 92, such as molded plastic coupling elements. As shown in FIG. 16A, the cut length of closed slide fastener chain 90 includes two fully-interlocked rows of molded coupling elements 92. Each row is secured to a slide fastener tape 94.

FIG. 16B is a top view of the end of the cut length of slide fastener chain 90 of FIG. 16A after notching. The notching step provides a notch or gap 96 at the end of the length of slide fastener chain in the correct orientation for accommodation of the mouth of a slider body. Here, the notching step removes a quantity of molded coupling elements 92 at the end of the cut length of slide fastener chain 90. Notching the end of the cut length of slide fastener chain 90 creates a space 96 for the cut end of the slide fastener chain 90 to be staged around the post of a slider body to be mounted thereon.

Figure 16C:
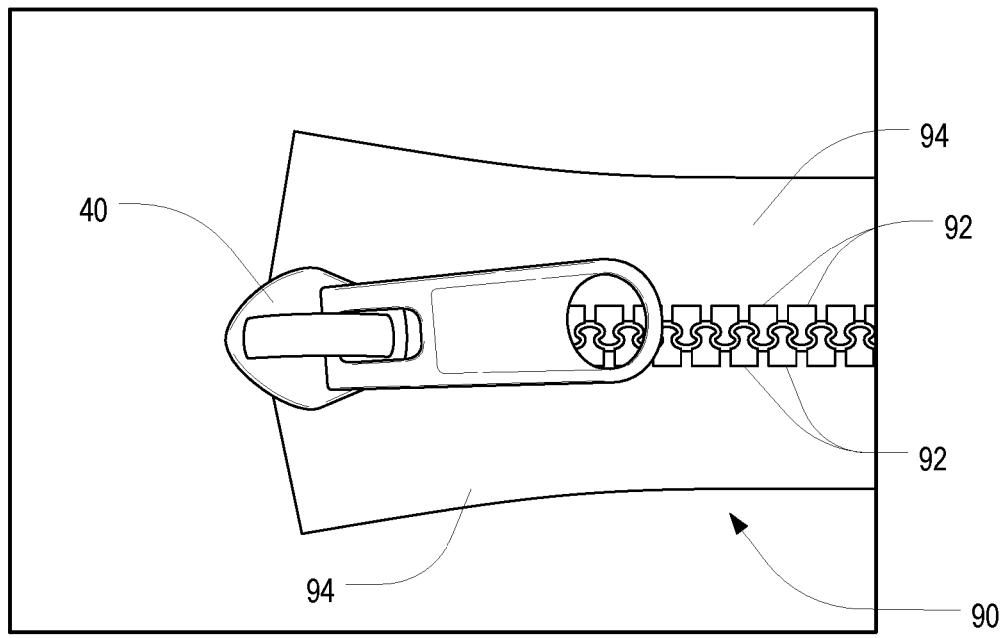
FIG. 16C is a top view of the end of the cut length of slide fastener chain of FIG. 16B, shown with a slider body introduced at the notched end.
Figure 16D:
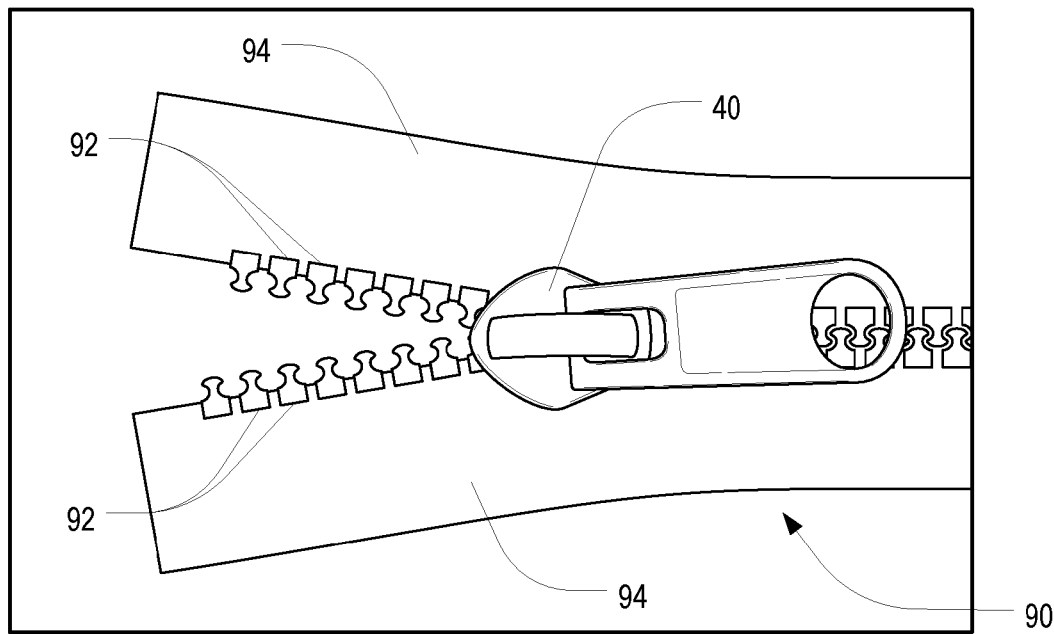
FIG. 16D is a top view of the end of the cut length of slide fastener chain of FIG. 16C, shown with the slider body mounted on the slide fastener chain.

FIG. 16C is a top view of the end of the cut length of slide fastener chain 90 of FIG. 16B, shown with a slider body 40 introduced at the notched end. As shown in FIG. 16C, the notched end of the length of slide fastener chain 90 is inserted into the mouth of the slider body 40 so that the post of the slider body 40 is situated in the notch 96. FIG. 16D is a top view of the end of the cut length of slide fastener chain 90 of FIG. 16C, shown with the slider body 40 mounted on the slide fastener chain 90. As shown in FIG. 16D, the cut length of slide fastener chain 90 has been pulled through the mouth of the slider body 40 by a short distance, thereby mounting the slider body 40 onto the rows of molded coupling elements 92. Once mounted, the slider body 40 is maneuverable to open or close the stringer halves by bringing the rows of molded coupling elements 92 into or out of interlocking arrangement, and the slide fastener chain 90 is ready for operational use.

Based on the foregoing information, it will be readily understood by those persons skilled in the art that the present invention is susceptible of broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention.

Accordingly, while the present invention has been described herein in detail in relation to one or more preferred embodiments, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements; the present invention being limited only by the claims appended hereto and the equivalents thereof.

What is claimed is:

1. A method of preparing a cut length of slide fastener chain for operational use, the method comprising:
   providing a system that includes first and second machines;
   providing a cut length of slide fastener chain;
   introducing a notch to one end of the cut length of slide fastener chain, using the first machine;
   orienting a slider body onto a positioning device, using the second machine, so that the slider body is in a fixed position;
   inserting the notched end of the cut length of slide fastener chain into a mouth of the slider body; and pulling the cut length of slide fastener chain through the slider body by a distance, thereby mounting the slider body to the cut length of slide fastener chain;

wherein the second machine includes a vibratory feed container that feeds slider bodies to the positioning device; and wherein the positioning device includes a pneumatic actuator for maneuvering slider bodies, one at a time, to the fixed position.

2. The method of claim 1, wherein the cut length of slide fastener chain includes coil-type coupling elements.

3. The method of claim 1, wherein the cut length of slide fastener chain includes molded coupling elements.

4. The method of claim 1, wherein the cut length of slide fastener chain includes metal coupling elements.

5. The method of claim 1, wherein introduction of the notch removes heads from a quantity of coupling elements located at the one end of the cut length of slide fastener chain without damaging adjacent coupling elements.

6. The method of claim 1, wherein introduction of the notch removes a quantity of coupling elements located at the one end of the cut length of slide fastener chain without damaging adjacent coupling elements.

7. The method of claim 1, wherein the first machine includes a mechanical punch press assembly having a punch and cutting die for removing or altering one or more coupling elements at the one end of the cut length of slide fastener chain.

8. The method of claim 7, wherein the first machine includes a foot pedal for actuating the mechanical punch press assembly to introduce the notch.

9. The method of claim 7, wherein the first machine includes pressure pads at one or both sides of the punch for gripping the cut length of slide fastener chain during introduction of the notch.

10. The method of claim 1, wherein the provided cut length of slide fastener chain is secured to at least a portion of a mattress cover.

* * * * *